(12) United States Patent
Linkovsky et al.

(10) Patent No.: US 10,564,853 B2
(45) Date of Patent: Feb. 18, 2020

(54) SYSTEM AND METHOD FOR LOCALITY DETECTION TO IDENTIFY READ OR WRITE STREAMS IN A MEMORY DEVICE

(71) Applicant: Western Digital Technologies, Inc., San Jose, CA (US)

(72) Inventors: Vitali Linkovsky, Beer Sheva (IL); Shay Benisty, Beer Sheva (IL); William Guthrie, Santa Cruz, CA (US); Scheheresade Virani, Frisco, TX (US)

(73) Assignee: Western Digital Technologies, Inc., San Jose, CA (US)

( * ) Notice: Subject to any disclaimer, the term of this patent is extended or adjusted under 35 U.S.C. 154(b) by 192 days.

(21) Appl. No.: 15/497,547

(22) Filed: Apr. 26, 2017

(65) Prior Publication Data
US 2018/0314421 A1 Nov. 1, 2018

(51) Int. Cl.
*G06F 3/06* (2006.01)
*G06F 13/42* (2006.01)

(52) U.S. Cl.
CPC ............ *G06F 3/061* (2013.01); *G06F 3/0659* (2013.01); *G06F 3/0679* (2013.01); *G06F 13/4282* (2013.01); *G06F 2213/0026* (2013.01)

(58) Field of Classification Search
CPC ...... G06F 3/061; G06F 3/0659; G06F 3/0679; G06F 13/4282; G06F 2213/0026
See application file for complete search history.

(56) References Cited

U.S. PATENT DOCUMENTS

| 7,386,674 | B1 | 6/2008 | Lango |
| 8,732,406 | B1* | 5/2014 | Pase ................... G06F 12/0862 |
| | | | 711/137 |
| 2005/0195635 | A1 | 9/2005 | Conley et al. |
| 2006/0161733 | A1 | 7/2006 | Beckett et al. |
| 2012/0151472 | A1 | 6/2012 | Koch et al. |
| 2014/0281040 | A1 | 9/2014 | Liu |
| 2015/0127882 | A1 | 5/2015 | Carlson et al. |
| 2015/0254088 | A1 | 9/2015 | Chou et al. |

(Continued)

OTHER PUBLICATIONS

International Search Report and Written Opinion for application No. PCT/US2018/019930 dated Jun. 4, 2018.

(Continued)

*Primary Examiner* — Ann J Lo
*Assistant Examiner* — Jane Wei
(74) *Attorney, Agent, or Firm* — Brinks Gilson & Lione

(57) ABSTRACT

Systems and methods for determining locality of an incoming command relative to previously identified write or read streams is disclosed. NVM Express (NVMe) implements a paired submission queue and completion queue mechanism, with host software on the host device placing commands into multiple submission queues. The memory device fetches the commands from the multiple submission queues, which results in the incoming commands being interspersed. In order to determine whether the incoming commands should be assigned to previously identified read or write streams, the locality of the incoming commands relative to the previously identified read or write streams is analyzed. One example of locality is proximity in address space. In response to determining locality, the incoming commands are assigned to the various streams.

22 Claims, 16 Drawing Sheets

(56) References Cited

U.S. PATENT DOCUMENTS

| | | |
|---|---|---|
| 2016/0004438 A1 | 1/2016 | Moon et al. |
| 2016/0077740 A1 | 3/2016 | Hussain et al. |
| 2016/0085718 A1 | 3/2016 | Huang |
| 2016/0140041 A1 | 5/2016 | Niu et al. |
| 2016/0147442 A1 | 5/2016 | Baderdinni et al. |
| 2016/0188510 A1 | 6/2016 | Singh et al. |
| 2016/0267016 A1 | 9/2016 | Lee et al. |
| 2016/0292007 A1 | 10/2016 | Ding et al. |
| 2016/0321012 A1 | 11/2016 | Clark et al. |
| 2017/0075629 A1 | 3/2017 | Manohar et al. |
| 2017/0075828 A1 | 3/2017 | Monji et al. |
| 2017/0083252 A1 | 3/2017 | Singh et al. |
| 2017/0109096 A1* | 4/2017 | Jean ............ G06F 3/0659 |
| 2017/0123659 A1 | 5/2017 | Nam et al. |
| 2017/0177222 A1 | 6/2017 | Singh et al. |

OTHER PUBLICATIONS

Janene Ellefson, SSD Product Market Manager—PCIe, Micron Technology, "NVM Express: Unlock Your Solid State Drives Potential", Flash Memory Summit 2013, Santa Clara, CA, 114 pages.

Kevin Marks, Dell, Inc., "An NVM Express Tutorial", Flash Memory Summit 2013, Santa Clara, CA, 92 pages.

Electronic unpublished U.S. Appl. No. 15/148,409 entitled "Systems and Methods for Processing a Submission Queue" filed on May 6, 2016, pending, 66 pages.

Specification and Drawings of U.S. Appl. No. 15/457,676 entitled "Storage System and Method for Thermal Throttling via Command Arbitration" filed on Mar. 13, 2017; 32 pages.

* cited by examiner

Stream Detection Entry Structure

| QW | 63           48 | 47 | 46 | 45        32 | 31           16 | 15         4 | 3   0 |
|----|-----------------|----|----|--------------|-----------------|--------------|-------|
| 0  | LLBA            |    |    |              |                 | --           | SN    |
| 1  | LAST_LEN        | DET | SM | --          | LRU             | CMD_CNT      |       |
| 2  | TOT_LEN         | SLBA |   |              |                 |              |       |

FIG. 10

Stream Detection Entry Field Description

| Field | Size | Description |
|---|---|---|
| SN | 4 | Sequence Number.<br>This field is a free running counter. Whenever, changing the DET bit in this entry from '0' to '1', the SN field is incremented. Otherwise, the value of this field must not be changed. |
| LLBA | 48 | Last Logical Block Address.<br>This field contains the LBA of the last command. |
| CMD_CNT | 16 | Command Count.<br>This field contains the number of commands associated with the stream i.e. CMD_CNT = min(16'hFFFF, CMD_CNT_prev+1) |
| LRU | 16 | Least Recently Used.<br>This field contains the LRU tag associated with the stream. It is used by the replacement algorithm. |
| SM | 1 | Stream Momentum.<br>This field holds the momentum of the stream.<br>1'b0 – Forward momentum.<br>1'b1 – Backward momentum. |
| DET | 1 | Detected.<br>This field specifies whether the stream candidate has become a stream using FW configured thresholds.<br>1'b0 – This entry does not contain a stream.<br>1'b1 – This entry contains a stream. |
| LAST_LEN | 16 | Last Length.<br>This field contains the length in sector granularity of the last command i.e. LAST_LEN = min(0xffff, CC.DLEN). |
| SLBA | 48 | Start LBA.<br>This field contains the start LBA of this stream. It is updated only when generating a new stream candidate and CMD_CNT field is initiated to 0x1. |
| TOT_LEN | 16 | Total Length.<br>This field contains the total length of all commands associated with the stream i.e. TOT_LEN = min(0xffff, (TOT_LEN_prev + CC.DLEN). |

FIG. 11

SYSTEM AND METHOD FOR LOCALITY DETECTION TO IDENTIFY READ OR WRITE STREAMS IN A MEMORY DEVICE

REFERENCE TO RELATED APPLICATION

This is a continuation-in-part application of U.S. application Ser. No. 15/468,620, filed on Mar. 24, 2017.

BACKGROUND

NVM Express (NVMe) is a standard for accessing non-volatile storage media attached via PCI Express (PCIe) bus. NVMe may be used with a variety of non-volatile storage media, such as solid state drives (SSDs). One focus of NVMe relates to I/O communication between a host device (which may access and/or write to the non-volatile storage media) and a memory device (which includes the non-volatile storage media). In that regard, NVMe implements a paired submission queue and completion queue mechanism, with host software on the host device placing commands into the submission queue. Completions are placed onto the associated completion queue by the memory device controller.

BRIEF DESCRIPTION OF THE DRAWINGS

The accompanying drawings, which are incorporated in and constitute a part of this specification, illustrate various aspects of the invention and together with the description, serve to explain its principles. Wherever convenient, the same reference numbers will be used throughout the drawings to refer to the same or like elements.

FIG. 10 is a table of the stream detection entry structure.

FIG. 11 is a table of the stream detection entry field description.

DETAILED DESCRIPTION OF EMBODIMENTS

Overview

Figure 1A:
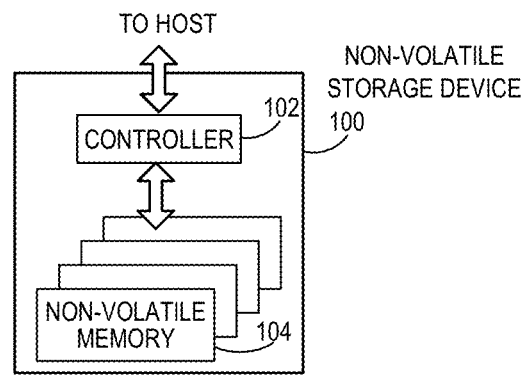
FIG. 1A is a block diagram of an exemplary non-volatile memory system.

As discussed in the background, the NVMe standard implements a paired submission queue and completion queue mechanism, with multiple pairings of submission-completion queues. For example, one type of submission-completion queue is an administrative submission-completion queue used for administrative commands to the memory device whereas another type of submission-completion queue is for other types of commands, such as read or write commands. As discussed further below, the commands from the multiple submission queues are fetched, resulting in the commands from the multiple queues being interspersed. Because of this interspersion, identifying streams of commands, such as read streams or write streams, may be difficult.

In one implementation, the memory device analyzes the incoming commands (e.g., the commands fetched by the memory device from the submission queues) to determine locality or proximity of commands to one another. Responsive to the memory device determining that an incoming command is proximate to command(s) previously assigned to the identified stream (termed stream command(s)), the incoming command is assigned to the identified stream. Thus, in a first specific implementation, the memory device, analyzing incoming read commands, detects a read stream. In a second specific implementation, the memory device, analyzing incoming write commands, detects a write stream.

With regard to the analysis, one or more aspects of the incoming command may be analyzed in order to determine whether the aspect(s) are local or proximate to the one or more aspects of the command(s) previously assigned to the identified stream. In one implementation, the memory device analyzes an address (or an address range) of the incoming command to determine whether the address (or address range) of the incoming command is local or proximate to an address (or address range) in the stream command(s). For example, the memory device may determine whether an incoming command is to be assigned to an identified stream (e.g., a read stream or a write stream). In response to determining that the incoming command is a read command, the memory device compares the incoming command to command(s) from identified read streams. Conversely, in response to determining that the incoming command is a write command, the memory device compares the incoming command to command(s) from identified write streams. In this example, the memory device compares the address (such as the logical block address (LBA) in the command), or an address range (such as the LBA range in the command as described by an LBA and the size of the command) with the address or the address range of the stream command(s). LBA is a linear addressing scheme used for specifying the location of blocks of data stored on computer storage devices. Other addressing schemes are contemplated.

With regard to comparing addresses, the memory device may compare the address in the incoming command with one, some or all of the addresses in the stream command(s). With regard to comparing address ranges, the memory device may compare the address range as defined by the incoming command with the address range of one, some or all of the addresses in the stream command(s). For example, the memory device may compare the address range of the incoming command with the address range of each of the stream commands. As another example, the memory device may compare the address range of the incoming command with the address range for the entire stream. The memory device may define the address range for the entire stream as being any address between a lowest address in the stream commands and a highest address in the stream commands. Thus, the address or the address range (such as the LBA range) of the incoming command may be determined to be proximate to the stream command(s) even though the address (or address range) of the incoming stream does not overlap, or is not contiguous to the addresses (or address range) of the incoming stream. In this regard, even though the incoming commands do not follow a consecutive address sequence, the commands may nevertheless be associated with the incoming stream if deemed local or proximate to the incoming stream. Further, the aspect of the incoming command (such as an address) may not be contiguous or coextensive to an aspect of the stream command(s); however, the analysis of locality or proximity may be indicative of a measure of nearness in space (such as nearness in address space) to one another. Any discussion below describing "locality" or "local" may also include "proximity" or "proximate".

Locality may be determined in one of several ways. In one implementation, the locality may be determined dynamically. In a first specific implementation, the locality may be based on the size of one of the stream commands (e.g., the size of the most recent command assigned to the stream). In a second specific implementation, the proximity may be based on the size of the incoming command. In another implementation, the proximity may be determined statically. For example, proximity may be based on a maximum predetermined value, a minimum predetermined value, or both a maximum predetermined value and a minimum predetermined value. In still another implementation, the proximity may be dynamically or statically determined. For example, the proximity may be based on the size of one of the stream commands (e.g., the size of the most recent command assigned to the stream) or may be based on a predetermined value (e.g., a maximum or minimum value).

Moreover, the identified stream may be used for one or more operations in the memory device. In one implementation, the memory device may use the identified write stream in order to perform a read look ahead (RLA). An example of performing an RLA is disclosed in US Published Application No. 2017/0075629, incorporated by reference herein in its entirety. In particular, the memory device may use the detected write streams as input to RLA algorithm, instead of or in addition to, a detected read stream. As one example, the memory device may analyze an incoming read command against previously determined write streams, without waiting to analyze whether the incoming read command is part of an incoming read stream. It may be assumed that the host device reads the data in the same way as it was previously written to the non-volatile memory in the memory device. Further, it may be assumed that random writes will be read in the same way as random reads, while sequential writes will be read in the same way as sequential reads. Thus, by analyzing the first read command against the previously determined write streams without waiting until the read stream is actually detected, the memory device may potentially perform RLA more quickly, thereby saving latency time in accessing the non-volatile memory.

In another implementation, the memory device uses the detected streams (such as the detected write and/or read streams) in order to determine addresses (or address ranges) that are often used in host device commands. These often used addresses (or address ranges) may be termed "hot addresses" or "hot address ranges". In practice, the host device may perform multiple accesses to specific LBA address or to specific small range of the LBA addresses. In order to more efficiently process commands (such as write commands or read commands), the memory device may use a frequently-used address algorithm in order to determine the specific address (such as the specific LBA address) or a specific range of addresses (such as the specific range of LBA addresses) frequently used. The frequently-used address algorithm may use the previously detected streams (such as the detected write streams and/or the detected read streams) in the determination. In particular, if the incoming command falls within a hot range of one of the previously detected streams, then the algorithm determines if the incoming command is a write command or a read command. If the incoming command is a write command, the memory device may save the data to an internal buffer (such as a volatile internal buffer), deferring saving the data into non-volatile memory. The saving to non-volatile memory may be deferred in expectation that the host device will soon rewrite the data. If the incoming command is a read command, the memory device reads the data from the internal buffer without performing a read access from the non-volatile memory.

Using this information, the memory device may more intelligently process host device commands without host device support. In particular, using this information generated by the frequently-used address logic, the memory device may save the data stored at the designated address in the internal buffer after the write access and read the data stored in the internal buffer during the read access without reading the data from non-volatile memory. In this way, the memory device may save transfer latency in both directions and may decrease the total number of accesses to the non-volatile memory device.

Embodiments

The following embodiments describe non-volatile memory devices and related methods for processing of commands. Before turning to these and other embodiments, the following paragraphs provide a discussion of exemplary non-volatile memory devices and storage modules that can be used with these embodiments. Of course, these are merely examples, and other suitable types of non-volatile memory devices and/or storage modules can be used.

FIG. 1A is a block diagram illustrating a non-volatile memory device 100. The non-volatile memory device 100 may include a controller 102 and non-volatile memory that may be made up of one or more non-volatile memory dies 104. As used herein, the term die refers to the set of non-volatile memory cells, and associated circuitry for managing the physical operation of those non-volatile memory cells, that are formed on a single semiconductor substrate. The controller 102 may interface with a host device or a host system and transmit command sequences for read, program, and erase operations to the non-volatile memory die(s) 104.

The controller 102 (which may be a flash memory controller) can take the form of processing circuitry, a microprocessor or processor, and a computer-readable medium that stores computer-readable program code (e.g., software or firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a flash memory controller is a device that manages data stored on flash memory and communicates with a host, such as a computer or electronic device. A flash memory controller can have various functionality in addition to the specific functionality described herein. For example, the flash memory controller can format the flash memory to ensure the memory is operating properly, map out bad flash memory cells, and allocate spare cells to be substituted for future failed cells. Some part of the spare cells can be used to hold firmware to operate the flash memory controller and implement other features. One example of the firmware is a flash translation layer. In operation, when a host device needs to read data from or write data to the flash memory, it will communicate with the flash memory controller. In one embodiment, if the host device provides a logical address to which data is to be read/written, the flash memory controller can convert the logical address received from the host to a physical address in the flash memory. The flash memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

The interface between the controller 102 and the non-volatile memory die(s) 104 may be any suitable flash interface, such as Toggle Mode 200, 400, or 800. In one embodiment, the memory device 100 may be a card based system, such as a secure digital (SD) or a micro secure digital (micro-SD) card. In an alternate embodiment, the non-volatile memory device 100 may be part of an embedded memory device.

Although in the example illustrated in FIG. 1A, the non-volatile memory device 100 may include a single channel between the controller 102 and the non-volatile memory die(s) 104, the subject matter described herein is not limited to having a single memory channel. For example, in some NAND memory device architectures, 2, 4, 8 or more NAND channels may exist between the controller and the NAND memory die(s) 104, depending on controller capabilities. In any of the embodiments described herein, more than a single channel may exist between the controller and the memory die(s) 104, even if a single channel is shown in the drawings.

Figure 1B:
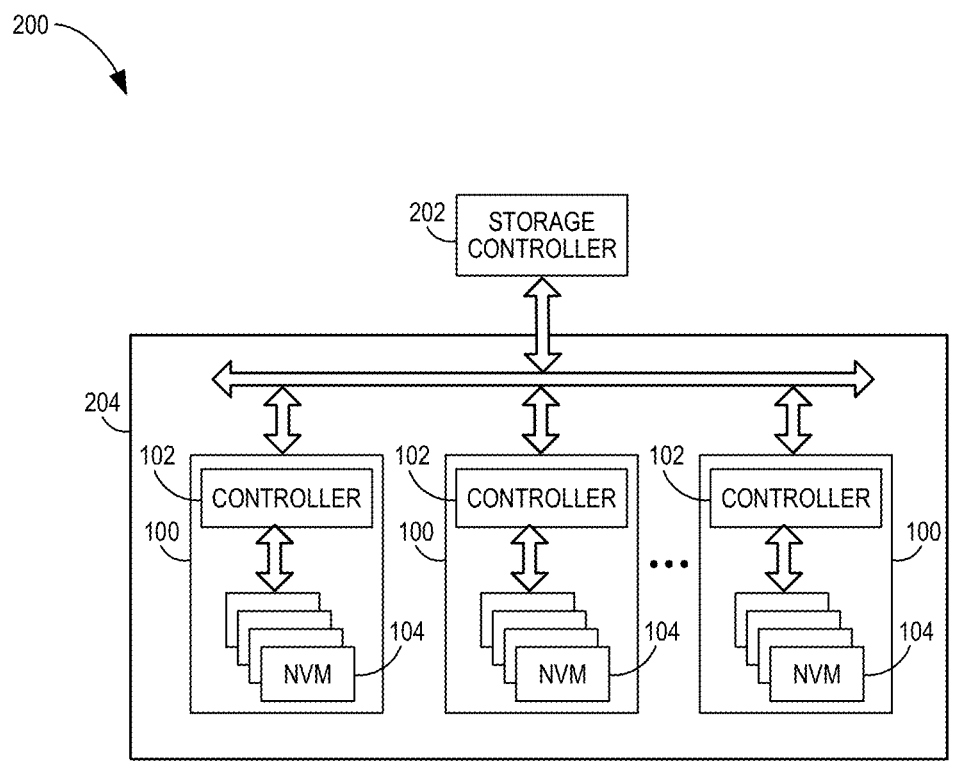
FIG. 1B is a block diagram of a storage module that includes a plurality of non-volatile memory systems and a host.

FIG. 1B illustrates a storage module 200 that includes plural non-volatile memory devices 100. As such, the storage module 200 may include a storage controller 202 that interfaces with a host 200 and with a storage system 204, which includes a plurality of non-volatile memory devices 100. The interface between the storage controller 202 and non-volatile memory devices 100 may be a bus interface, such as a serial advanced technology attachment (SATA), a peripheral component interface express (PCIe) interface, an embedded MultiMediaCard (eMMC) interface, a SD interface, or a Universal Serial Bus (USB) interface, as examples. The storage system 200, in one embodiment, may be a solid state drive (SSD), such as found in portable computing devices, such as laptop computers and tablet computers, and mobile phones.

Figure 1C:
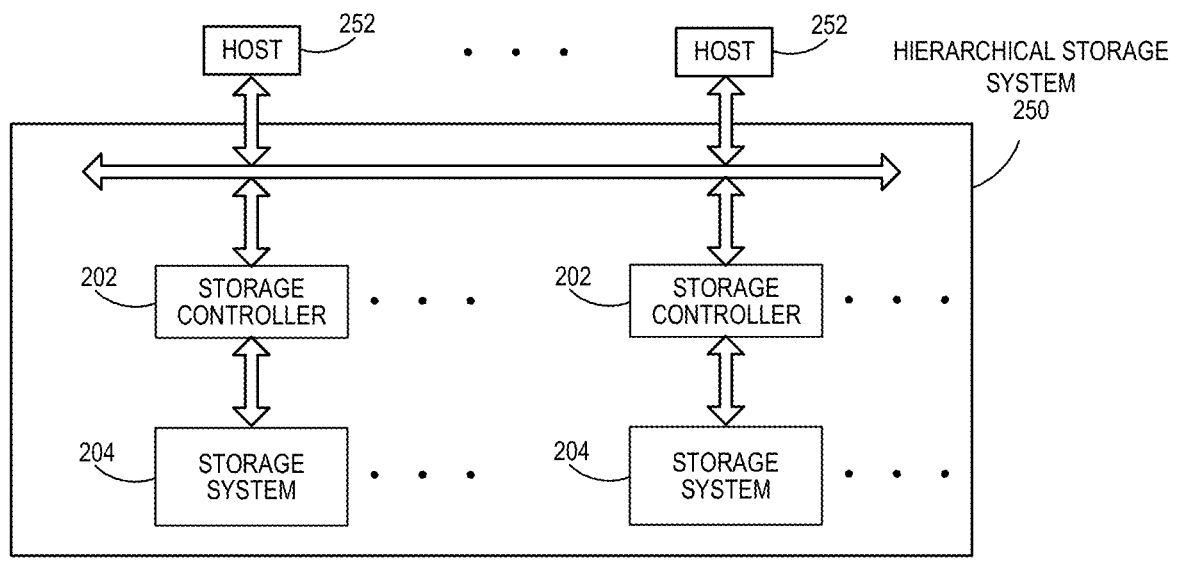
FIG. 1C is a block diagram of a hierarchical storage system.

FIG. 1C is a block diagram illustrating a hierarchical storage system 250. The hierarchical storage system 250 may include a plurality of storage controllers 202, each of which control a respective storage system 204. Host systems 252 may access memories within the hierarchical storage system 250 via a bus interface. Example bus interfaces may include a non-volatile memory express (NVMe), a fiber channel over Ethernet (FCoE) interface, an SD interface, a USB interface, a SATA interface, a PCIe interface, or an eMMC interface as examples. In one embodiment, the hierarchical storage system 250 illustrated in FIG. 1C may be a rack mountable mass storage system that is accessible by multiple host computers, such as would be found in a data center or other location where mass storage is needed. In one embodiment, host systems 252 may include the functionality described in host 200.

Figure 2A:
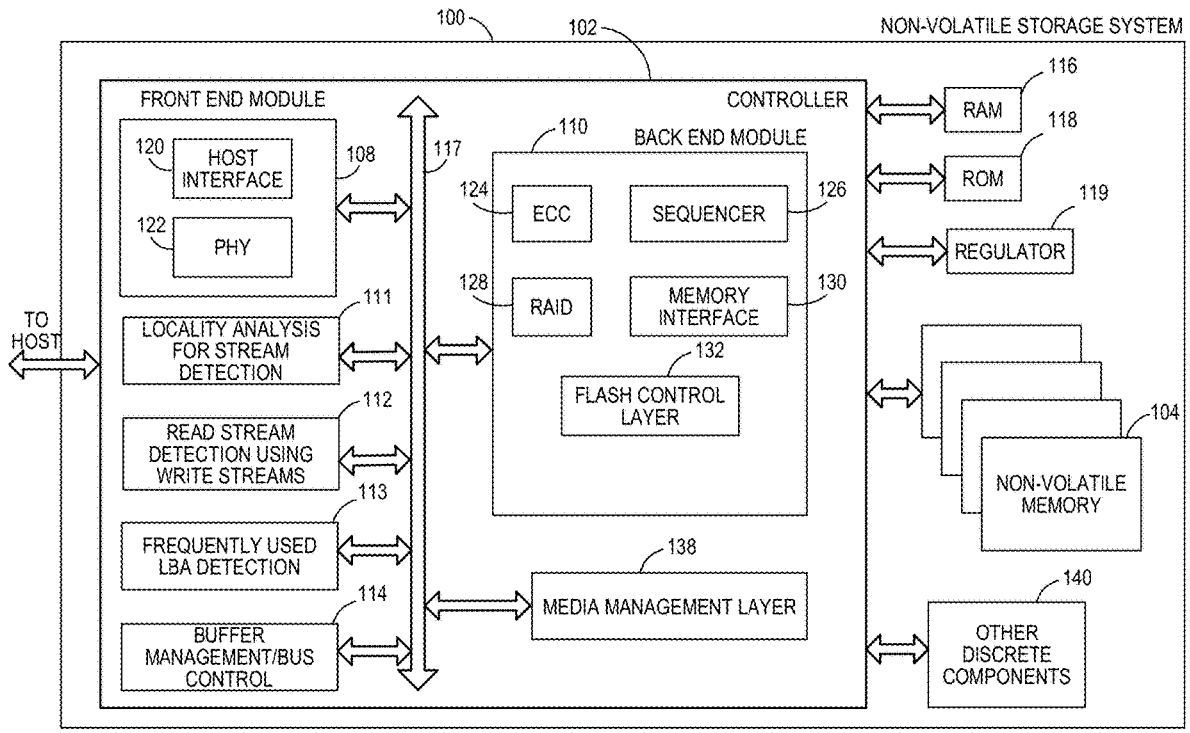
FIG. 2A is a block diagram of exemplary components of a controller of the non-volatile memory system of FIG. 1A.

FIG. 2A is a block diagram illustrating exemplary components of the controller 102 in more detail. The controller 102 may include a front end module 108 that interfaces with a host, a back end module 110 that interfaces with the non-volatile memory die(s) 104, and various other modules that perform various functions of the non-volatile memory device 100. In general, a module may be hardware or a combination of hardware and software. For example, each module may include an application specific integrated circuit (ASIC), a field programmable gate array (FPGA), a circuit, a digital logic circuit, an analog circuit, a combination of discrete circuits, gates, or any other type of hardware or combination thereof. In addition or alternatively, each module may include memory hardware that comprises instructions executable with a processor or processor circuitry to implement one or more of the features of the module. When any one of the module includes the portion of the memory that comprises instructions executable with the processor, the module may or may not include the processor. In some examples, each module may just be the portion of the memory that comprises instructions executable with the processor to implement the features of the corresponding module without the module including any other hardware. Because each module includes at least some hardware even when the included hardware comprises software, each module may be interchangeably referred to as a hardware module.

The controller 102 may include a buffer manager/bus control module 114 that manages buffers in random access memory (RAM) 116 and controls the internal bus arbitration for communication on an internal communications bus 117 of the controller 102. A read only memory (ROM) 118 may store and/or access system boot code. Although illustrated in FIG. 2A as located separately from the controller 102, in other embodiments one or both of the RAM 116 and the ROM 118 may be located within the controller 102. In yet other embodiments, portions of RAM 116 and ROM 118 may be located both within the controller 102 and outside the controller 102. Further, in some implementations, the controller 102, the RAM 116, and the ROM 118 may be located on separate semiconductor dies.

Additionally, the front end module 108 may include a host interface 120 and a physical layer interface (PHY) 122 that provide the electrical interface with the host or next level storage controller. The choice of the type of the host interface 120 can depend on the type of memory being used. Examples types of the host interface 120 may include, but are not limited to, SATA, SATA Express, SAS, Fibre Channel, USB, PCIe, and NVMe. The host interface 120 may typically facilitate transfer for data, control signals, and timing signals.

The back end module 110 may include an error correction controller (ECC) engine 124 that encodes the data bytes received from the host, and decodes and error corrects the data bytes read from the non-volatile memory die(s) 104. As discussed in more detail below, the ECC engine may be tunable, such as to generate different amounts of ECC data based on the mode (e.g., generate normal mode ECC data in normal programming mode and generate burst mode ECC data in burst programming mode, with the burst mode ECC data being greater than the normal mode ECC data). The back end module 110 may also include a command sequencer 126 that generates command sequences, such as program, read, and erase command sequences, to be transmitted to the non-volatile memory die(s) 104. Additionally, the back end module 110 may include a RAID (Redundant Array of Independent Drives) module 128 that manages generation of RAID parity and recovery of failed data. The RAID parity may be used as an additional level of integrity protection for the data being written into the non-volatile memory device 100. In some cases, the RAID module 128 may be a part of the ECC engine 124. A memory interface 130 provides the command sequences to the non-volatile memory die(s) 104 and receives status information from the non-volatile memory die(s) 104. Along with the command sequences and status information, data to be programmed into and read from the non-volatile memory die(s) 104 may be communicated through the memory interface 130. In one embodiment, the memory interface 130 may be a double data rate (DDR) interface, such as a Toggle Mode 200, 400, or 800 interface. A flash control layer 132 may control the overall operation of back end module 110.

Thus, the controller 102 may include one or more management tables for managing operations of storage system 100. One type of management table includes logical-to-physical address mapping table. The size of logical-to-physical address mapping table may grow with memory size. In this regard, the logical-to-physical address mapping table for high capacity storage device (e.g., greater than 32 G) may be too large to store in SRAM, are may be stored in non-volatile memory 104 along with user and host data. Therefore, accesses to non-volatile memory 104 may first require reading the logical-to-physical address mapping table from non-volatile memory 104.

Additional modules of the non-volatile memory device 100 illustrated in FIG. 2A may include a media management layer 138, which performs wear leveling of memory cells of the non-volatile memory die 104. The non-volatile memory device 100 may also include other discrete components 140, such as external electrical interfaces, external RAM, resistors, capacitors, or other components that may interface with controller 102. In alternative embodiments, one or more of the RAID module 128, media management layer 138 and buffer management/bus controller 114 are optional components that may not be necessary in the controller 102.

Other modules of the non-volatile memory device 100 illustrated in FIG. 2A may include locality analysis for stream detection 111, read stream detection using write streams 112 and frequently used LBA detection 113. As discussed in more detail below, the memory device may use the locality analysis for stream detection 111 in order to identify streams, such as read streams or write streams. The memory device may further use the read stream detection using write streams 112 in order to determine whether a read stream is associated with a previously detected write stream, and in turn perform a read look ahead based on the previously detected write stream. In addition, the memory device may use the frequently used LBA detection 113 in order to determine the LBA address or LBA address range frequently used by the host device, and in turn determine where to store data (in the event of an incoming write command) or where to read data (in the event of an incoming read command).

Figure 2B:
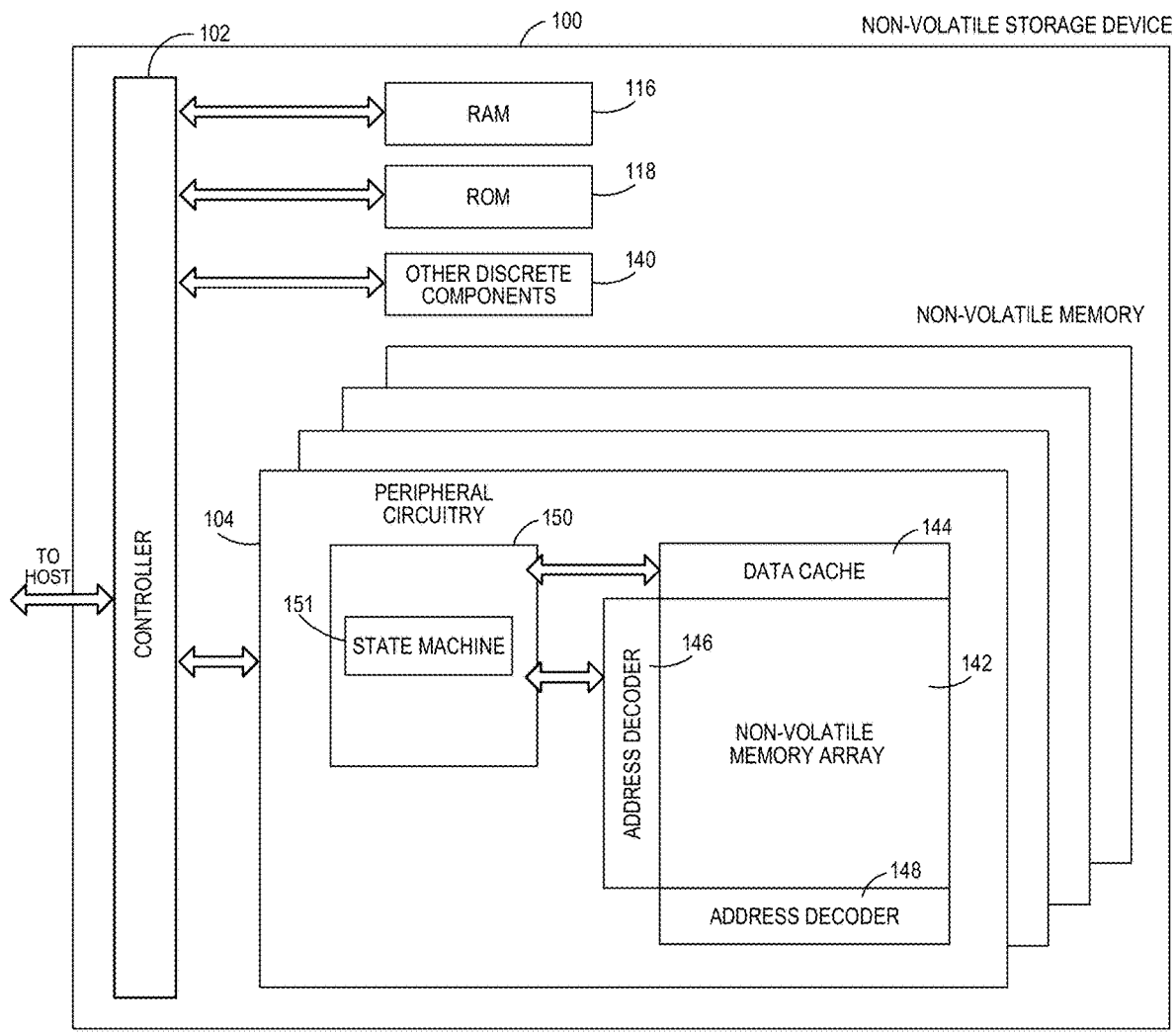
FIG. 2B is a block diagram of exemplary components of a non-volatile memory die of the non-volatile memory system of FIG. 1A.

FIG. 2B is a block diagram illustrating exemplary components of a non-volatile memory die 104 in more detail. The non-volatile memory die 104 may include a non-volatile memory array 142. The non-volatile memory array 142 may include a plurality of non-volatile memory elements or cells, each configured to store one or more bits of data. The non-volatile memory elements or cells may be any suitable non-volatile memory cells, including NAND flash memory cells and/or NOR flash memory cells in a two dimensional and/or three dimensional configuration. The memory cells may take the form of solid-state (e.g., flash) memory cells and can be one-time programmable, few-time programmable, or many-time programmable. In addition, the memory elements or cells may be configured as single-level cells (SLCs) that store a single bit of data per cell, multi-level cells (MLCs) that store multiple bits of data per cell, or combinations thereof. For some example configurations, the multi-level cells (MLCs) may include triple-level cells (TLCs) that store three bits of data per cell.

Additionally, a flash memory cell may include in the array 142 a floating gate transistor (FGT) that has a floating gate and a control gate. The floating gate is surrounded by an insulator or insulating material that helps retain charge in the floating gate. The presence or absence of charges inside the floating gate may cause a shift in a threshold voltage of the FGT, which is used to distinguish logic levels. That is, each FGT's threshold voltage may be indicative of the data stored in the memory cell. Hereafter, FGT, memory element and memory cell may be used interchangeably to refer to the same physical entity.

The memory cells may be disposed in the memory array 142 in accordance with a matrix-like structure of rows and columns of memory cells. At the intersection of a row and a column is a FGT (or memory cell). A column of FGTs may be referred to as a string. FGTs in a string or column may be electrically connected in series. A row of FGTs may be referred to as a page. Control gates of FGTs in a page or row may be electrically connected together.

The memory array 142 may also include wordlines and bitlines connected to the FGTs. Each page of FGTs is coupled to a wordline. In particular, each wordline may be coupled to the control gates of FGTs in a page. In addition, each string of FGTs may be coupled to a bitline. Further, a single string may span across multiple wordlines, and the number of FGTs in a string may be equal to the number of pages in a block.

The non-volatile memory die 104 may further include a page buffer or data cache 144 that caches data that is sensed from and/or that is to be programmed to the memory array 142. The non-volatile memory die 104 may also include a row address decoder 146 and a column address decoder 148. The row address decoder 146 may decode a row address and select a particular wordline in the memory array 142 when reading or writing data to/from the memory cells in the memory array 142. The column address decoder 148 may decode a column address to select a particular group of bitlines in the memory array 142 to be electrically coupled to the data cache 144.

In addition, the non-volatile memory die 104 may include peripheral circuitry 150. The peripheral circuitry 150 may include a state machine 151 that provides status information to the controller 102. Other functionality of the state machine 151 is described in further detail below.

Figure 3:
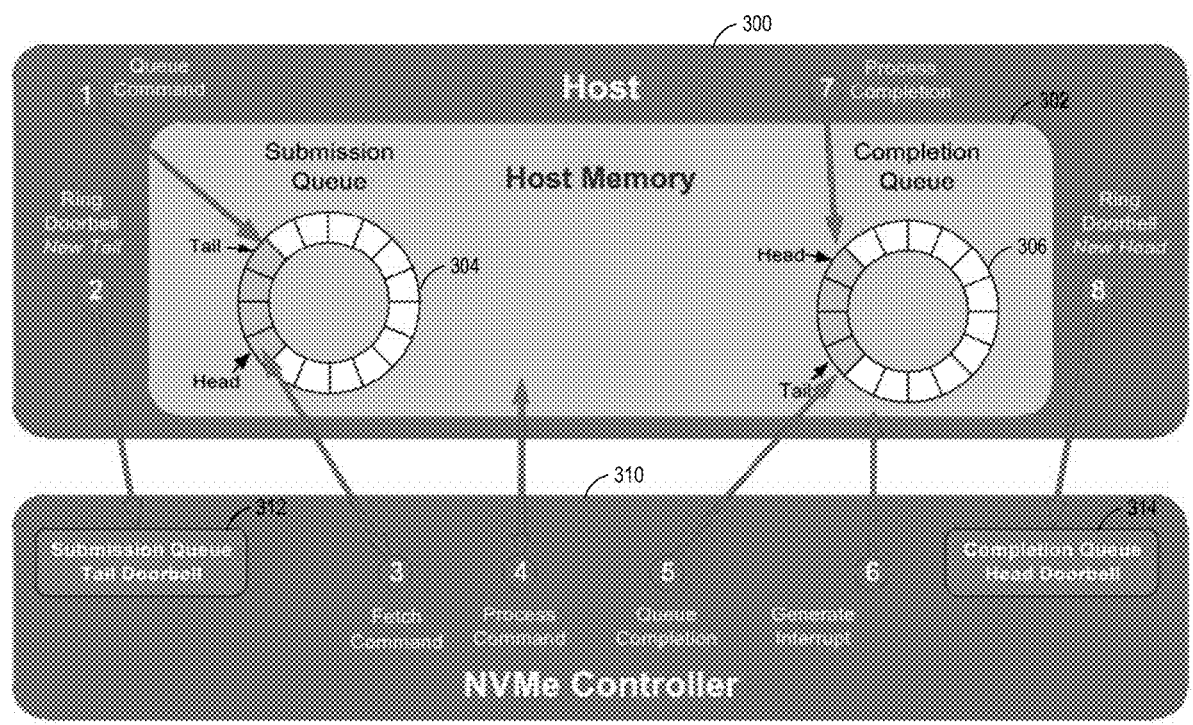
FIG. 3 is a block diagram of the host device and NVMe controller illustrating a sequence for a host device and a memory device to request and process an NVMe command.

FIG. 3 illustrates a sequence of steps for processing a command via the NVMe standard. As shown, the host device 300 includes host memory 302, and the memory device includes a controller, such as an NVMe controller 310. In one implementation, the host memory 302 includes a submission queue 304 and a completion queue 306. Further, in one implementation, the submission queues and completion queues may have a 1:1 correlation. Alternatively, the submission queues and completion queues do not have a 1:1 correlation.

In practice, at the initialization phase, the host device 300 creates one or more submission queues and one or more corresponding completion queues. In particular, the host device 300 may notify the memory device of the submission queue(s) and completion queue(s) by sending information, such as the base address for each queue to the memory device. In that regard, each submission queue has a corresponding completion queue. When the submission queue and the completion queue are resident in the host device, the host device sends information to the memory device in order for the memory device to determine the locations of the submission queue and the completion queue in the host device. In a specific implementation, the host device sends a command indicating the creation of the submission queue and the completion queue. The command may include a PRP1 pointer, which is a pointer to a list on the host device of the locations of the specific submission queue or the specific completion queue. In practice, the memory device sends a TLP read request using the PRP1 in order to obtain the PRP list, and stores the PRP list in the memory device to determine the memory locations within the host device for use in future commands to read from the specific submission queue or write to the specific completion queue. Alternatively, the host device 300 may instruct the memory device to create the submission queue(s) and corresponding completion queue(s) in a memory resident in the memory device, such as a controller memory buffer.

The submission queue 304 may be based on a ring buffer, such as illustrated in FIG. 3, with a head pointer and a tail pointer. After creating the submission queue(s) and notifying the memory device about the created submission queue(s), the host device 300 may write a command (or several commands) to the submission queue. This is indicated in FIG. 3 as step 1, labeled "Queue Command". In particular, FIG. 3 illustrates that four commands were written to the submission queue. In one implementation, the memory device is unaware that the host device 300 has updated the submission queue 304 with four commands, since the host device 300 updated its own host memory 302. In another implementation (such as when the submission queue(s) and completion queue(s) are resident in the controller memory buffer, the memory device may monitor a communication interface between the host device 300 and the memory device for particular communications, such as writing to the submission queue(s) resident on the memory device. For example, the memory device can monitor the transport layer packets (TLPs) on the PCI Express bus, to determine whether the host device 300 has sent a TLP that results in an update to the submission queue resident in the controller memory buffer. In that regard, the memory device may identify one or more entries being written to the submission queue(s).

In step 2, the host device 300 writes to a submission queue tail doorbell register 312 in the memory device. This writing to the submission queue tail doorbell register 312 signifies to the memory device that the host device queued one or more commands in this specific submission queue 304 (e.g., 4 commands as illustrated in FIG. 3). The writing to the submission queue tail doorbell register 312 may take one of several forms. In one way, the host device 300 indicates a new tail for the submission queue 304, thereby indicating the number of commands written to the submission queue 304. Thus, since the memory device is aware of the base address for the submission queue 304, the memory device only needs to know the tail address to indicate the number of new commands written to the submission queue 304. After a command (or a set of commands) is processed, the memory device then sets the new head of the submission queue 304 accordingly. So that, the tail pointer may represent an "offset" from the head pointer. In another way, the host device 300 indicates a number of commands written to the submission queue 304. In practice, each submission queue 304 has a corresponding submission queue tail doorbell register in the memory device, so that when the host device 300 updates a particular doorbell register (correlated to a particular submission queue 304), the memory device can determine, based on the doorbell register, which particular submission queue 304 has been updated.

After step 2 (whereby the memory device is notified of command(s) on the submission queue 304) and before step 3 (whereby the memory device fetches the command(s)), the memory device is aware that there are command(s) pending in the submission queue 304. In the general case, there may be several submission queues (with potentially many pending commands in the several submission queues). Thus, before performing step 3, the memory device controller may arbitrate between the various submission queues to select the particular submission queue from which to fetch the command(s).

Responsive to determining which particular submission queue 304 from which to fetch the command(s), at step 3, the memory device fetches the command(s) from the particular submission queue 304. In practice, the memory device may access the base address of the particular submission queue 304 plus the pointer on the current head pointer implemented in the host device 300.

The submission queue or completion queue may be assigned an area of memory (such as in the host device or in the controller memory buffer in the memory device). The submission queue and completion queues may include multiple entries, each associated with a specific command. The size of each entry may be a predetermined size, such as 64 bytes. In this regard, entries within the submission queue may be determined using the base address for the submission queue, and by offsetting the base address with the number of entries multiplied by the size of each entry (e.g., 64 bytes).

The memory device is aware of the tail pointer, having been notified via step 2. Thus, the memory device can obtain all of the new commands from the submission queue 304. In a submission queue resident on the host device, the memory device may send a TLP request to obtain the command(s) from the submission queue 304. Responsive to receipt of the TLP request, the host device 300 sends a completion TLP message with the commands in the submission queue 304. In this regard, at end of step 3, the memory device receives the command(s) from the submission queue 304.

At step 4, the memory device processes the command. In one implementation, the memory device parses the commands, and determines the steps to execute the commands (e.g., read/write/etc.). For example, the command may comprise a read command. Responsive to receipt of the read command, the memory device parses the read command, implements the address translation, and accesses the flash to receive the data. After receiving the data, the memory device causes the data to be stored on the host device based on information in the command (e.g., the PRP 1 discussed below). As another example, the command may comprise a write command. Responsive to receipt of the write command, the memory device parses the write command, determines the location of the data on the host device subject to the write, reads the data from the location on the host device, and writes the data to flash memory.

In particular, the memory device may receive a read command or write command with a PRP1 pointer. For example, a read command, in which the host device requests the memory device to read from the flash memory, includes a PRP1 pointer, which points to a PRP list. The memory device obtains the PRP list in order to determine the memory locations within the host device to write the data that was read from the flash memory. As another example, a write command, in which the host device requests the memory device to write data to the flash memory, includes a PRP1 pointer, which points to a PRP list. The memory device obtains the PRP list in order to determine the memory locations within the host device to read the data from (and thereafter save the read data to the flash memory).

Each entry in the PRP list may be associated with a certain section in the host device memory, and may be a predetermined size, such as 4 Kb. Thus, in a 1 Mb transfer, there may be 250 references in the PRP list, each 4 Kb in size. In practice, the memory device may retrieve data out of sequence. This may be due to the data subject to retrieval being on several flash dies, with the dies being available for data retrieval at different times. For example, the memory device may retrieve the data corresponding to 100-200 Kb of the 1 Mb transfer before retrieving the data corresponding to 0-100 Kb of the 1 Mb transfer. Nevertheless, because the memory device has the PRP list (and therefore knows the memory locations the host device expects the data corresponding to 100-200 Kb to be stored), the memory device may transfer the data corresponding to 100-200 Kb of the 1 Mb transfer without having first retrieved the data corresponding to 0-100 Kb of the 1 Mb transfer.

In NVMe, there may be a multitude of PCI Express TLPs to transfer the data from the memory device to the host device 300. Typically, the transferred data is stored in the host memory 302 of the host device 300 based on an indication in the command (e.g., the command includes an address to store the requested data.

After completing the data transfer, at step 5, the memory device controller sends a completion message to the relevant completion queue 306. As mentioned above, at the initialization phase, the host device 300 associates submission queues with completion queues. So that, the host device 300 is aware of commands that are completed in the submission queue based on which completion queue the memory device writes to. The completion message may contain information as to the processing of the command(s), such as whether the command was completed successfully or whether there was an error when executing the command.

After step 5, the host device 300 is unaware that the memory device posted to the completion queue 306. This is due to the memory device causing data to be written to the completion queue 306. In that regard, at step 6, the memory device notifies the host device 300 that there has been an update to the completion queue 306. In particular, the memory device posts an interrupt to the host device 300 (e.g., in NVMe, the host device 300 may use an MSIe interrupt).

Responsive to receiving the interrupt, the host device 300 determines that there are one or more completion entries pending for the host device 300 in this completion queue 306. At step 7, the host device 300 then processes the entries in the completion queue 306. For example, with a completion queue resident in the memory device, the host device may send a TLP read request to read the completion queue resident in the memory.

After the host processes the entries from the completion queue 306, at step 8, the host device 300 notifies the memory device of the entries that the host device 300 processed from the completion queue 306. This may be performed by updating a completion queue head doorbell register 314 indicative to the memory device that the host device 300 processed one or more entries from the completion queue 306. When the Host issues completion queue doorbell write, the parameters of the relevant interrupt coalescing vector may be updated to reflect this change. For instance, the status of the completion queue may be changed from an almost full state to an almost empty state. As a result, an interrupt may be flushed to the host device.

Responsive to updating the completion queue head doorbell register 314, the memory device updates the head of the completion queue 306. Given the new head, the memory device is aware as to which entries in the completion queue 306 have already been processed by the host device 300 and may be overwritten.

As discussed above, the memory device may fetch commands from one or submission queues. The commands fetched may be part of a stream of commands. In one implementation, the stream is a set of commands with sequential or nearly sequential LBAs that is sent to the memory device in a narrow timeframe. NVMe allows the host device to supply stream information in each command; however, this feature is often not used. In the absence of the stream information in each command, the memory device may still process host commands intelligently without host support, such as by using the stream detection discussed in further detail below. Using the detected stream information, the memory device may activate the RLA methodology, which may speculatively access data from the non-volatile flash and store the data to temporal buffers while trying to save the latency associated with sensing of and the transfer of data from the non-volatile flash memory, as discussed further below.

Figure 4:
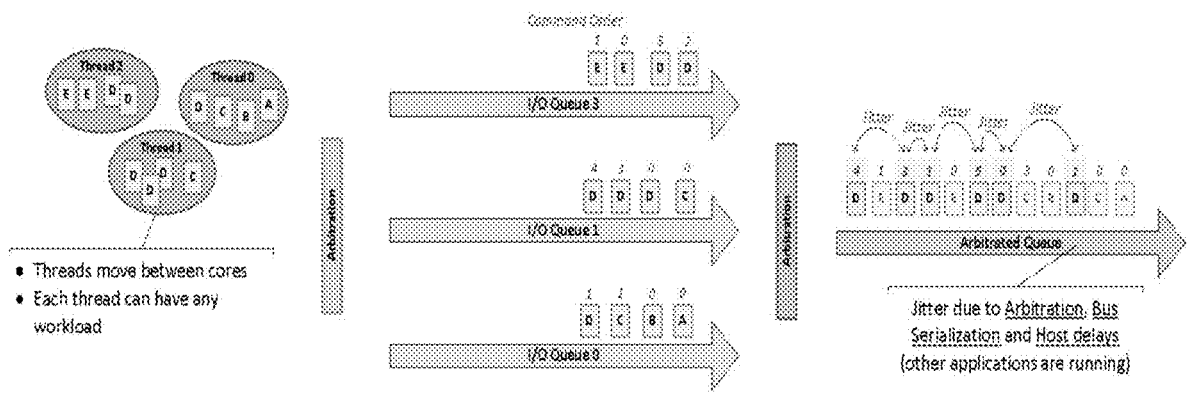
FIG. 4 is a diagram illustrating command flow in the NVMe platform.

The NVMe standard, with fetching commands from multiple submission queues, may complicate stream detection. In practice, the host device may have multi-processors, with each processor potentially having its own NVMe submission queue. Each processor may have any workload, although there is a potential that the commands within a specific thread have a locality relation. However, the memory device fetches the commands from the submission queues out of order, thereby potentially losing the locality of the commands which may exist within a specific submission queue. This is illustrated in FIG. 4, which is a diagram illustrating command flow in the NVMe platform. For example, thread 0 may have commands A, B, C, D, which are placed on the thread's associated submission queue (I/O Queue 0). The memory device may perform an arbitration to fetch the commands from the various submission queues (such as I/O Queue 0, I/O Queue 1, and I/O Queue 3). For example, in determining which commands to fetch from the submission queues, the memory device may use an arbitration algorithm, such as a round-robin algorithm or a weighted round-robin algorithm, in order to determine the order in which to fetch commands from the multiple submission queues. With the round-robin, the memory device selects the commands placed in the different submission queues in a symmetrical manner. With the weighted round-robin, the memory device selects the commands placed in the different submission queues in a non-symmetric way in which each submission queue has its own priority assigned by the host device at the initialization phase. In either implementation, the commands from the various submission queues are dispersed in the arbitrated queue, such as illustrated in FIG. 4. In this regard, stream detection may be more difficult in NVMe.

In one way, the memory device may detect the stream by analyzing a set of commands received sequentially. In particular, if the commands received have a consecutive LBA (i.e., the next LBA=the Current LBA+the command size), the memory device may detect the sequentionality. As discussed above, the fetched commands in NVMe may be out of order; however, the LBAs of the fetched commands, as a group, may have sequentionality (e.g, may have consecutive LBAs). In another way, the memory device may detect the stream based on a HASH algorithm. In particular, the commands, which may arrive out of order, are collected in bitmap buckets. The lower address bits of the start LBA are masked out to produce a range that is hashed. However, this methodology may not identify streams with short runs of adjacent LBAs. In this regard, these two options lack the flexibility and adaptability to identify streams when fetching commands from multiple submission queues.

Thus, in one implementation, stream detection is based on command locality detection rather than on command sequential detection. A stream may comprise a set of commands of the same type (such as read or write commands) that are related through one or more aspects, such as the ranges of their logical transfer addresses. The memory device may use the identified streams in one of several situations. For example, for situations with low queue depth and throughput, the memory device can reduce latency, regardless of command length, by reading the anticipated stream data from non-volatile memory (such as flash memory) into volatile memory (such as SRAM or DRAM). In particular, when one or more read streams is detected, the memory device may begin to prepare the read data within the dedicated buffers even before the first read command is executed. Thus, to be able to predict the data that the memory device will be reading from the non-volatile memory, the memory device may detect possible read streams within arriving commands from the host device.

Commands in a stream may not necessarily be strictly sequential in their transfer addresses. Further, successive commands may be local to each other in address space within a relatively narrow definition of locality. Various examples of locality are described in more detail below. Commands in a stream may have some commonality, such as closeness in LBA space; however, each command may have a starting address that is higher or lower than the address of the preceding command. Further, the commands may not always be in the same relative direction (e.g., forward or backward direction). As discussed above, NVMe is particularly prone to local, stream-based, but not strictly sequential access patterns.

Figure 5:
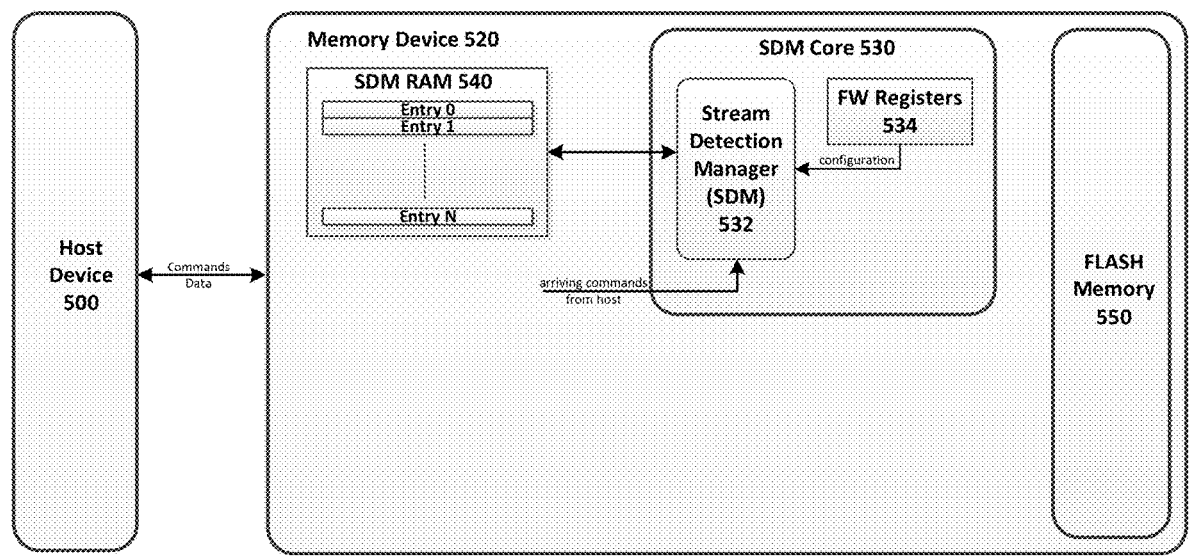
FIG. 5 is a block diagram of other exemplary components of a host system and a memory device.

FIG. 5 is a block diagram of other exemplary components of a host device 500 and a memory device 520, with the memory device 520 including a stream detection manager (SDM) 532 for command locality detection and flash memory 550. The SDM 532 may be part of an SDM core 530 that includes firmware (FW) registers 534 that may provide configuration input to the SDM 532. For example, the FW registers 534 may provide input regarding the MinGap (e.g., an indication of minimum proximity) and MaxGap (e.g., an indication of maximum proximity), as discussed in more detail below.

The host device may send commands that are related to one another, such as sequential read commands, or may send commands that are random and unrelated to one another. The SDM 532 may analyze the locality of the commands, regardless of randomness, in order to process the commands more efficiently. For example, even if the commands themselves are random, the LBAs of the commands may have sequentionality. In this regard, the locality analysis discussed below may identify the sequentionality so that the memory device may cache the data from flash memory, and may therefore process the host commands more efficiently.

In one implementation, the SDM 532 may inspect incoming commands to determine if they are perfectly, or nearly sequential to one of the last set of incoming commands of the same direction (e.g., read or write). Further, the SDM 532 may support ordered commands and out-of-order commands. In practice, the memory device 520 may parse the incoming command, check using the SDM 532 whether any locality is detected with the previously parsed commands, and accumulate the contiguous commands into a specific entry (e.g., such as SDM RAM 440) according to the predefined parameters. When the preconfigured threshold is crossed, an entry may be declared as a stream. In one implementation, there is a maximum number of the concurrent entries. In this implementation, old entries in the list of potential entries may be removed and/or overridden, as discussed in more detail below.

Further, in one implementation, the SDM 532 may use a locality detection algorithm. The memory device may analyze one, some or all of the commands fetched from the submission queue. For example, for each incoming command (InCmd), the SDM 532 may check if the command is a read command or a write command. For read commands, the SDM 532 checks the incoming command against all read streams. In one implementation, read streams may include read stream candidates and read streams. A read stream candidate is one or more commands that the SDM 532 has not yet determined to be a read stream. In a specific implementation, in response to certain characteristics of the read stream candidate (such as a certain number of commands being associated with the read stream candidate or the sum of the address ranges for the one or more commands associated with the read stream candidate being greater than a total address range length), the SDM 532 may change the designation from a read stream candidate to a read stream.

Conversely, for write commands, the SDM 532 checks the incoming command against all write streams (such as write stream candidates and write streams). Similar to read streams, a write stream candidate is one or more commands that the SDM 532 has not yet determined to be a write stream. Further, the SDM 532 may change the write stream candidate to a write stream in response to determining certain characteristics of the write stream candidate (such as total number of commands or the total address range for the commands associated with the write stream candidate). In one implementation, after designation as a write stream, the memory device may use the designated write stream for further processing. For example, incoming read commands may be compared with write streams to determine whether to perform an RLA, as discussed further below.

As discussed further below, the SDM may iterate through each entry for the selected set (e.g., read or write) of stream candidates (Stream[x]) and check if the range of the coming command is local to an existing stream or a candidate stream. An incoming command may be assigned to a stream if the incoming command is deemed local (e.g., close enough in value) to one or more commands already assigned to a respective stream (e.g., close enough to the last command assigned to the respective candidate stream).

Various methods may be used to determine locality of the incoming command to the stream. In one implementation, a gap may be used to judge locality. As discussed above, the gap may be based on the length of the incoming command and/or based on one or more commands already assigned to a respective stream (e.g., the length of the last command assigned to the respective candidate stream).

In one implementation, the gap value may be calculated from the contents of three registers associated with each command direction. In a first specific implementation, the command may be assigned to the first candidate stream for which it is found to be within the gap distance of the command last added to the candidate stream. In a second specific implementation, the command may be assigned to the first candidate stream for which it is found to be within the gap distance of any command added to the candidate stream. The three parameters are:

LenMult: Length Multiplier is used to multiply the last command length (or another command length) to calculate the allowed gap. A command may be assigned to the stream if the distance to the last command (or to another command within the candidate stream) is less than or equal to the gap. This field may have any number.

MinGap: Minimum Gap is used for the gap value if the length multiplier times last command length is smaller than a predetermined amount. Minimum Gap may be used because the command length in streams is variable and if the last command assigned to a respective stream is small, the SDM 532 may seek to substitute a different minimum gap value.

MaxGap: Maximum Gap is used for the gap value if the length multiplier times the last command length is larger than the amount of data that is sensible to pre-read.

Stream qualification may be performed by comparing the stream count and stream run length to threshold values. The threshold values may be entered in the configuration registers (such as FW registers 534). Further, in one implementation, the threshold values may be different for read streams and write streams.

The locality condition may depend on the length of the last command in the entry and its range. First, the SDM 532 may calculate the allowed gap, which as discussed above may be defined by the LenMult, MinGap, MaxGap, and which may be defined by the FW and the length of the last command.

The equation below describes one example of the calculation made by the SDM 532 in order to find the gap.

$$Gap=\min(\max(LAST\_LEN*LenMult, MinGap), MaxGap)$$

Other gap calculations are contemplated. After calculating the allowed gap, the SDM 532 may determine whether the LBA range of the incoming command is overlapped with the range of any one, any combination, or all of the commands in the candidate stream while adding the gap in one or both directions. As one example, the SDM 532 may determine whether the LBA range of the incoming command is overlapped with the range of the last command while adding the gap in both directions. As another example, the SDM 532 may determine whether the LBA range of the incoming command is overlapped with the range of the last command while adding the gap in only one direction (e.g., in the event of stream momentum detection). As still another example, the SDM 532 may determine whether the LBA range of the incoming command is overlapped with the range of one or more of the commands in the candidate stream while adding the gap to one or both directions.

Figure 6:
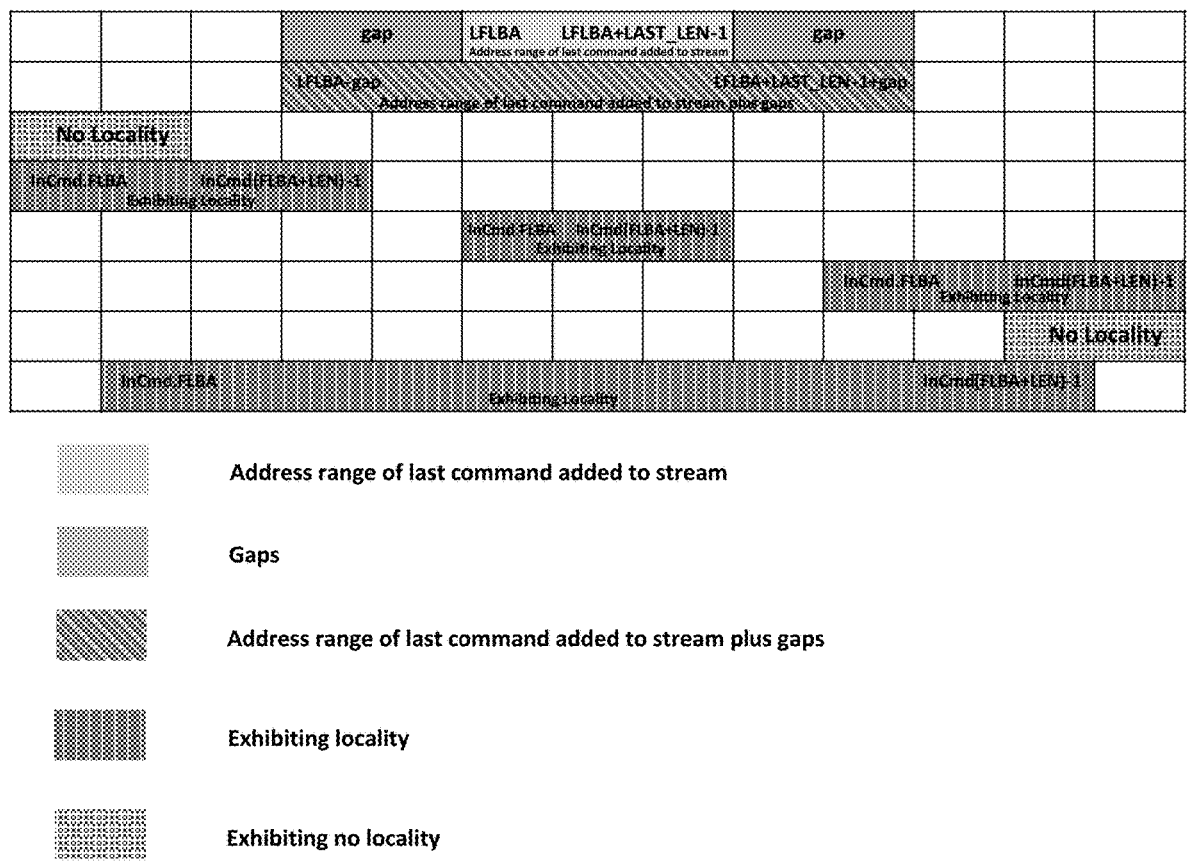
FIG. 6 is an illustration of the locality determination with LBA ranges from different commands.

FIG. 6 is an illustration of the locality determination with LBA ranges from different commands. In particular, FIG. 6 illustrates the calculation made in order for the SDM 532 to detect if the command is local to the candidate stream. The incoming commands, listed as exhibiting locality, are detected as local to the stream since there is an overlap between the command and the last command stored in the slot while considering the allowed gap. The new command, listed as not exhibiting locality, is not local to the stream since their LBA range is too far.

As discussed above, the LBA range of the stream may be determined in one of several ways. In one way (illustrated in FIG. 6), the LBA range may be determined based on the range of the last command added to the stream (e.g., as determined by the start LBA and size of the last command added to the stream). In another way, the LBA range may be determined based on the ranges of some, but not all, of the commands added to the stream. In still another way, the LBA range may be determined based on the ranges of all of the commands added to the stream.

The equation below describes the calculation made by the SDM 532 in order to determine if the incoming command is local to the currently fetched entry:

$$LocDet=(LLBA-gap<=InCmd(LBA+LEN)-1<=LLBA+LAST\_LEN-1+gap)OR$$

$$(LLBA-gap<=InCmd.LBA<=LLBA+LAST\_LEN-1+gap)OR$$

$$(InCmd.LBA<=LLBA-gap)\&(LLBA+LAST\_LEN-1+gap<=InCmd(LBA+LEN)-1)$$

When LocDet is detected (meaning that the incoming command is local to the currently fetched entry), the index of the entry may be saved for the future use.

Referring back to FIG. 6, the top line shows the address range of the last command of the candidate stream or the stream. As one example, a single command from the candidate stream may determine the address range for the candidate stream. Each entry may be in one of three categories: (1) a candidate to stream entry (as discussed above, when one or more thresholds of the candidate stream are met, the candidate stream is designated as a stream); (2) a stream entry (the one or more thresholds have been met for designation as a stream); or (3) an empty entry (at the beginning of the operation or resulting from clearing an oldest entry).

As shown in FIG. 6, the candidate stream is described in the table shown in FIG. 11 as the Last Block Address (LLBA), or the LBA of the last command added to the candidate stream. Further, the candidate stream is described by the length of last command added to the candidate stream (LAST_LEN). Thus, in address space, the address range of the last command added to the candidate stream is from LLBA to LLBA+LAST_LEN-1. As another example, multiple commands from the candidate stream may determine the address range of the candidate stream. In particular, some or all of the address ranges correlating to the commands previously associated with the candidate stream may define the address range for the SDM 523.

FIG. 6 further illustrates a gap, which may be added to one or both sides of the address range of the candidate stream. As discussed above, the gap may be determined in a variety of ways, such as based on the command(s) in the candidate stream and/or the incoming command. The second line in FIG. 6 illustrates the address range of the candidate stream plus the gaps. Thus, the second line in FIG. 6 is one example of how locality is determination. As discussed above, other examples of locality determination are contemplated.

The third line in FIG. 6 is the first incoming command analyzed. As shown, the address range of the first incoming command does not overlap at all with the address range of the candidate stream plus the gaps. In this regard, the SDM 523 determines that the first incoming command has no locality with the candidate stream.

The fourth, fifth and sixth lines in FIG. 6 correlate to the second, third and fourth incoming commands analyzed. As shown, the address range of the second, third, and fourth incoming commands each at least partly overlap with the address range of the candidate stream plus the gaps. In particular, the second incoming command overlaps on the left side of the candidate stream plus the gaps (and more specifically over the left gap). The fourth incoming command overlaps on the right side of the candidate stream plus the gaps (and more specifically over the right gap). Finally, the third incoming command is coextensive with the address range of the candidate stream. In this regard, the SDM 523 determines that the second, third and fourth incoming commands have locality with the candidate stream. The equation for the location detect (LocDet) includes three elements, with the first element determining if there is overlap on the left (corresponding to the second incoming command), the second element determining if the address is subsumed within the address stream of the candidate stream plus the gaps (corresponding to the third incoming command), and the third element determining if there is overlap on the right (corresponding to the fourth incoming command).

The seventh line in FIG. 6 is the fifth incoming command analyzed. As shown, the address range of the fifth incoming command does not overlap at all with the address range of the candidate stream plus the gaps. In this regard, the SDM 523 determines that the fifth incoming command has no locality with the candidate stream. Finally, the eighth line in FIG. 6 is the sixth incoming command analyzed. As shown, the address range of the sixth incoming command completely overlaps with the address range of the candidate stream plus the gaps. In this regard, the SDM 523 determines that the sixth incoming command has locality with the candidate stream.

As illustrated in FIGS. 7A-C and FIG. 8, the new incoming commands are analyzed by the SDM 532. In a specific implementation, the SDM 532 adds all new incoming commands to the entries table. The SDM 532 fetches all read or write commands (according to the type of the received command). For each fetched entry, the SDM 532 may check for the following: locality; if no locality is detected, the SDM checks whether the entry is empty or not; if no locality is detected and the entry is not empty, the SDM 532 may determine whether to remove a least recently used entry (e.g., the SDM 532 checks the CurrLruDiff and updates LruDiff if necessary, as discussed further below. In one implementation, when the SDM 532 completes the fetching of all entries, the SDM 532 updates the database according to description in the algorithm flow.

The SDM database, used by the SDM 532, may be stored in various parts of the memory device. In one implementation, the SDM database may be stored in volatile memory, such as RAM, and may maintain a table of stream candidates. In a more specific implementation, the dedicated space in volatile memory may be divided into read entries and write entries, with firmware specifying the number of stream candidates of each type. For each stream candidate, the SDM 532 may store one or more aspects about the historical commands (such as addresses and/or sizes) which may assist the SDM 532 to detect streams.

Figure 7A:
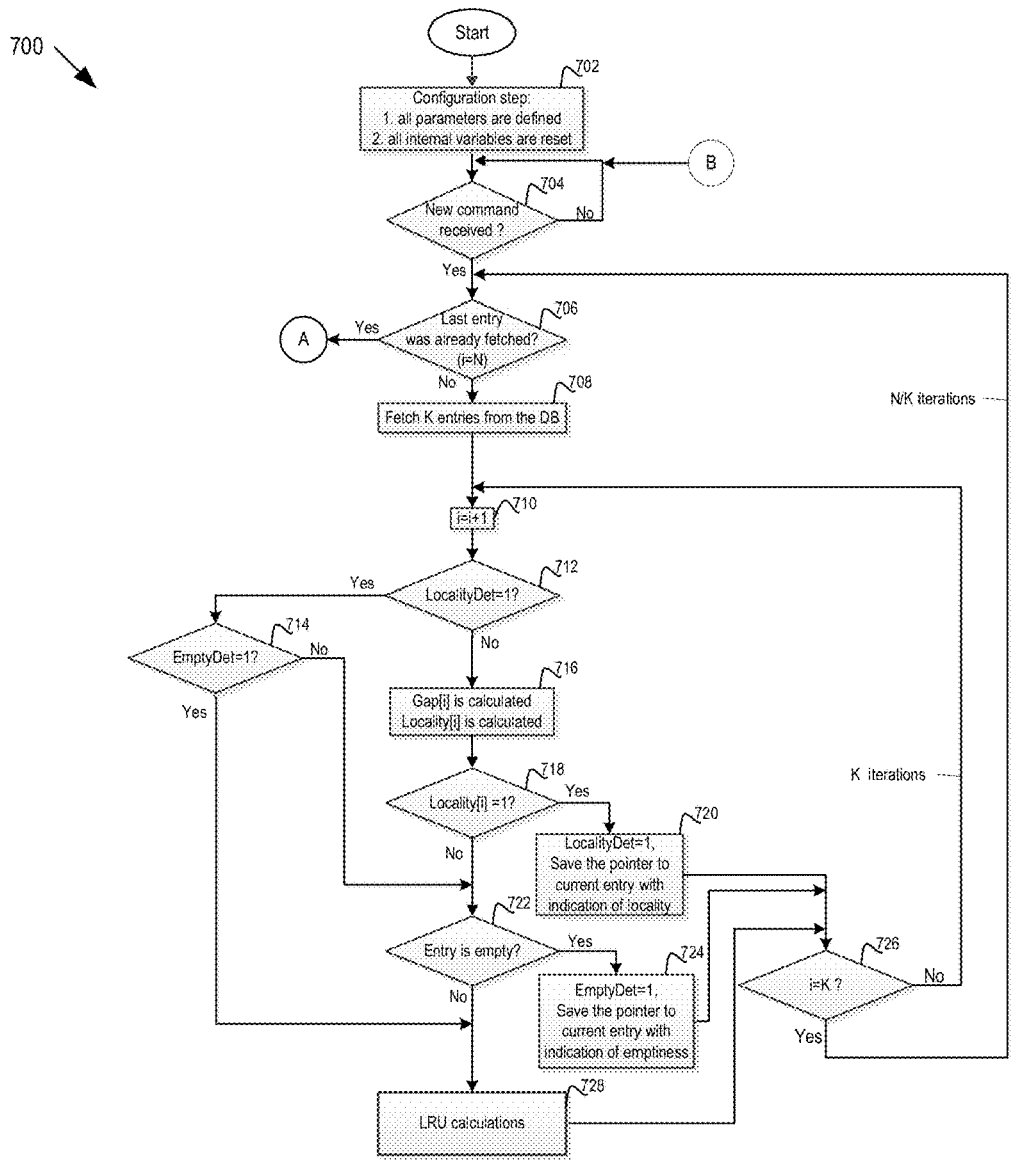
FIGS. 7A-C are a flow chart of a first example method of operation of the SDM.
Figure 7B:
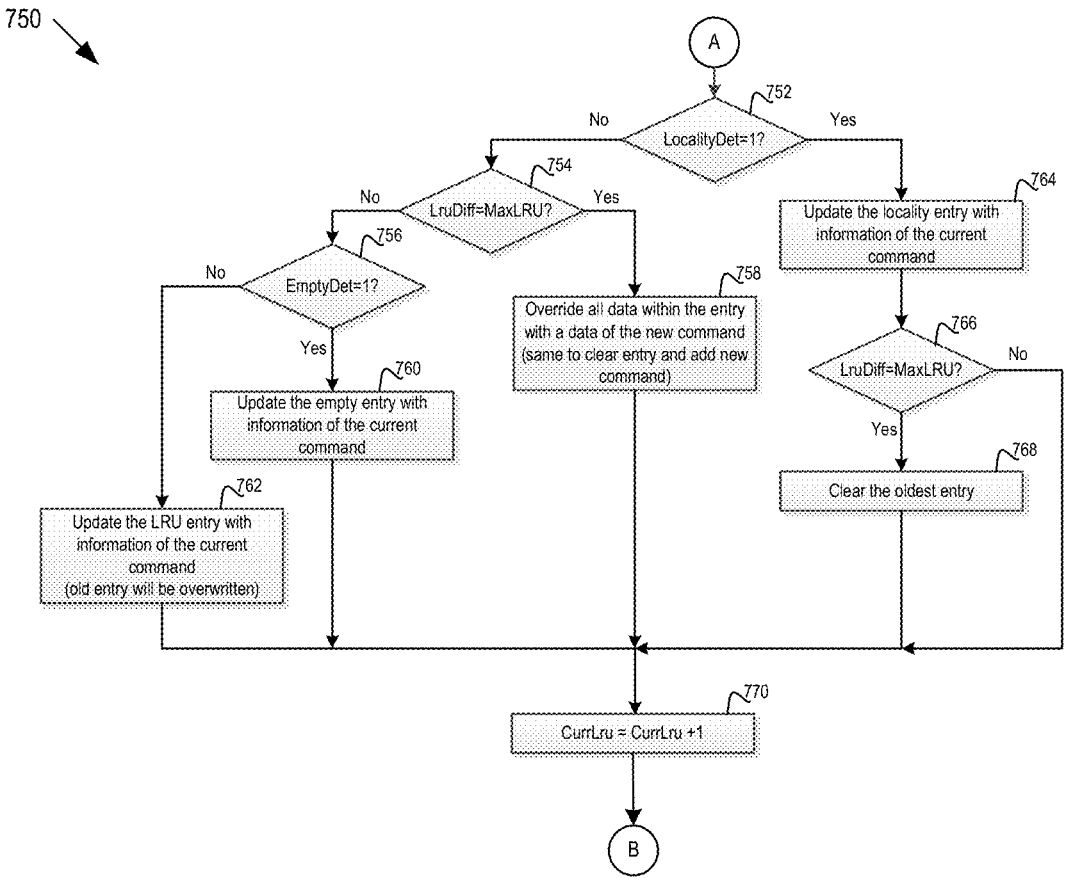
Figure 7C:
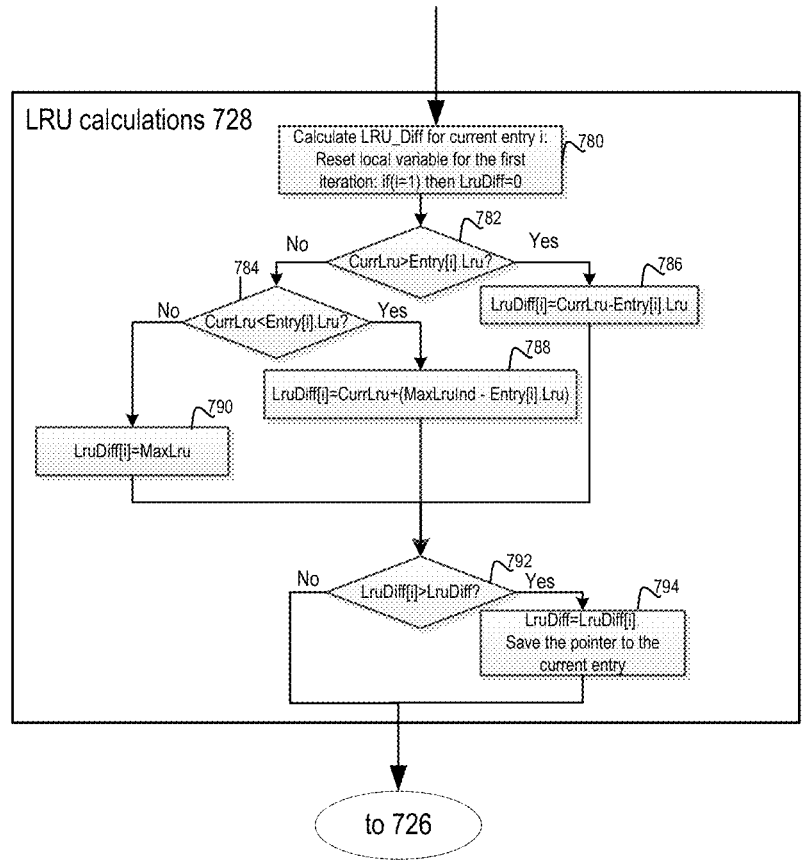

FIGS. 7A-C are a flow chart 700 of a first example method of operation of the SDM. The flow chart 700 is directed to one type of the commands, such as read commands. Other types of commands, such as write commands, may likewise be used.

At 702, initialization may be performed in which N number of entries defined in a database in memory device may be used to store candidate/streams. The size and structure of the entry may be defined in the table illustrated in FIG. 10. Further, all necessary parameters for the SDM 532 operation are defined at 702.

For example, at the initialization phase, the firmware may configure the maximum number of read streams (READ_STREAMS) and write streams (WRITE_STREAMS) in the system. This configuration may determine the structure of the SDM database. In particular, entries 0 to READ_STREAMS-1 may describe read stream candidates while entries READ_STREAMS to READ_STREAMS+WRITE_STREAMS-1 specify write stream candidates.

At 704, the SDM waits to receive a new incoming command. At 706, the SDM 532 determines if the last entry has already been fetched. If so, flow chart 700 moves to "A". If not, at 808, the SDM 532 begins to read K entries from the database. In one implementation, the SDM 532 may read and examine one entry at a time. Alternatively, the SDM 532 may read and examine multiple entries at the same time to increase performance. K may be defined as follows:

K definition: $1 \leq K \leq N$, N % K=0 (whereby modulo N/K operation is 0)

The internal variable i may be defined to indicate the number of the current entry. At the beginning of the operation, i=0.

At 710, the SDM 523 increments variable i and begins to perform checks of conditions and calculations on the first entry i. At 712, the SDM 532 checks whether locality was already detected before or not. If yes, at 714, the flow chart moves to 728. If not, the flow chart moves to 722.

Thus, in one implementation, locality detection is terminated upon finding the first entry that the incoming command exhibits locality to. In an alternative implementation, the algorithm may find all entries, in the current list of entries, that the incoming command exhibits locality to. Thereafter, the algorithm may select the single entry that exhibits the best locality condition. As one example, the entry which has an address range with a minimum gap from the incoming command may be selected as having the best locality. In this alternative implementation, LRU analysis may be performed on all entries, including entries that were detected as local but which did not exhibit the best locality.

At 716, the SDM 532 calculates the gap (such as the address range gap as illustrated in FIG. 6) and calculates locality for the current entry i (such as adding the address range gap to both sides of address range LLBA to LLBA+LAST_LEN-1). At 718, the SDM 532 checks whether or not the entry passed one or more locality conditions. For example, as illustrated in FIG. 6, the SDM 532 may check whether the address range of the incoming command at least partly overlaps the address range of the candidate stream plus gaps). If locality was detected, at 720, the SDM 523 performs following steps: asserts LocalityDet variable (used as condition check for subsequent entries); saves the index (location) of the current entry for further use; and begins to check next entry.

If the locality was not detected, at 722, the SDM checks whether or not the current entry is an empty entry. If so, the SDM 532 finds the first one free (empty) entry only. In particular, at 724, the SDM 532 performs the following: asserts EmptyDet variable (subsequently used as a condition check for next entries); saves the index (location) of the current entry for further use; and begins to check next entry.

If the current entry i has no locality detection and has no empty detection, the entry is checked in order to determine whether to remove the entry. One basis for removing entries is by measuring "oldness" using a least recently used (LRU) methodology. Other methodologies to determine whether to remove the entry are contemplated. The following are definitions for the LRU methodology:

MaxLru: value configured within the register (constant during the operation)

MaxLruInd: is the index derived from MaxLru. MaxLruInd=MaxLru−1

CurrLru: an internal counter that incremented each time a new command received, and counts between 0, 1, . . . MaxLruInd, 0, 1 . . .

Entry[i].Lru: the LRU value of the entry i. Each time when current command added to the entry (LBA and SIZE), the LRU field is updated with the value of the CurrLru, meaning that the updated entry is newest one.

LruDiff[i]: is an LRU difference between CurrLru and Entry[i].Lru. (i.e., LruDiff[i]=CurrLru−Entry[i].Lru). The result of subtraction gives an indication the "oldness" of the current entry i.

LruDiff: is an internal variable that has a result of LruDiff [i]. It is updated only if a new LruDiff[i] value is bigger than the LruDiff. LruDiff thus has a biggest difference value at the end of SDM operation.

Given the LRU definitions, at 728, the SDM performs LRU calculations. FIG. 7C illustrates exemplary LRU calculations 728. For example, at 780, the SDM calculates the LRU_Diff for current entry i; resets the local variable for the first iteration; and if i=1, the LruDiff=0:

At 782, the SDM 532 determines the following condition: whether CurrLru>Entry[i].Lru. Typically, this should be the case because the CurrLru is incremented with each new command received; however, Entry[i].Lru remains constant (until next entry's update). Nevertheless, the SDM 532 supports the cases when wraparound occurred on CurrLru value (where the flow chart moves to 784, discussed below).

If CurrLru>Entry[i].Lru, at 786, the SDM 532 calculates the simple subtraction to determine the LruDiff[i] of the current entry.

If CurrLru is not greater than Entry[i].Lru, at 784, the SDM 532 checks if CurrLru<Entry[i].Lru. If so, a wraparound has occurred, so that at 788, so that the actual difference is calculated as the following:

LruDiff[i]=CurrLru+(MaxLruInd−Entry[i].Lru)

If CurrLru is not less than Entry[i].Lru, this is the last specific case whereby CurrLru=Entry[i].Lru, meaning that this is a maximal difference that could ever be. In this regard, the current entry is an oldest one. In such a case, at 790, the LruDiff[i] of the current entry will get the maximal possible value MaxLru.

At 792, the SDM 532 determines if the LruDiff[i] of the current entry is bigger than the LruDiff value. If so, it is then overridden. In particular, at 794, the LruDiff is set equal to LruDiff[i] and the index (address) of the current entry is saved for further use.

At 726, the SDM 532 determines whether internal variable i is less than K (the number of entries retrieved from the database). If not, flow chart 700 iterates back to 710. If so, flow chart iterates back to 706. Further, at 706, if the last entry is already fetched, flow chart 700 goes to "A". In particular, after completing all iterations, all entries were already checked and all necessary data was accumulated. The SDM 532 may then proceed to the second phase as illustrated in FIG. 7B.

At 752, the SDM 532 determines whether locality has been detected (e.g., by examining LocalityDet=1). If locality was detected, at 764, the locality entry is updated with information of the current command. For example, the following fields of the locality entry are updated: LLBA and LAST_LEN: overwritten with the LBA and SIZE of the new command; CMD_CNT: incremented by 1; TOT_LEN incremented by SIZE of the new command; LRU: overwritten with the CurrLru value (LRU is updated each time command is added); DET: asserted if entry changes its type from candidate to stream (when CMD_CNT or/and TOT_LEN reaches pre-configured threshold); stream momentum (SM): indicative of stream momentum.

Stream momentum may be used as a trending direction of access. Further, stream momentum may be relevant in deciding which LBA ranges to read in order to obtain a hit on the RLA, as discussed further below. In one implementation, the momentum of a stream may be defined by comparing the last LBA to the start LBA. If the last one is bigger, it is considered as a forward stream momentum. Otherwise, it is considered as a backward stream momentum.

In a specific implementation, the stream momentum (SM) comprises a single bit, and is updated according to the following equation:

If(CC_LBA>Entry.SLBA)SM=0,else SM=1 where:

CC_LBA: LBA of a new command

Entry.SLBA: Start LBA of the stream (the Entry.SLBA field may be updated once when a first command added to the entry)

SM=0 indicative of forward momentum; SM=1 indicative of backward momentum.

At 766, the SDM 532 determines whether the oldest entry was found (e.g., LruDiff=MaxLRU). If so, at 768, this oldest entry is cleared and may be used for a new candidate/stream.

If locality was not detected at 752, the SDM 532 may still check whether to open up a new candidate/stream with the current command. Thus, at 754, the SDM 532 checks whether LruDiff=MaxLRU. If (LruDiff=MaxLRU), then at 758, the new command will overwrite the oldest entry's data. If not, at 756, the SDM 532 determines if an empty entry was detected. If so, at 760, the SDM 532 updates the empty entry with information of the current command. If not, at 762, then the new command's data will overwrite the old entry's data that was found at 740. At 770, the CurrLru variable is incremented. In this way, after completing all iterations and updating the entry, the internal counter, with CurrLru value incremented, may be used when a new incoming command arrives. Finally, at "B", the SDM 532 completed its operation, with the flow chart 750 looping back to 704.

Figure 8:
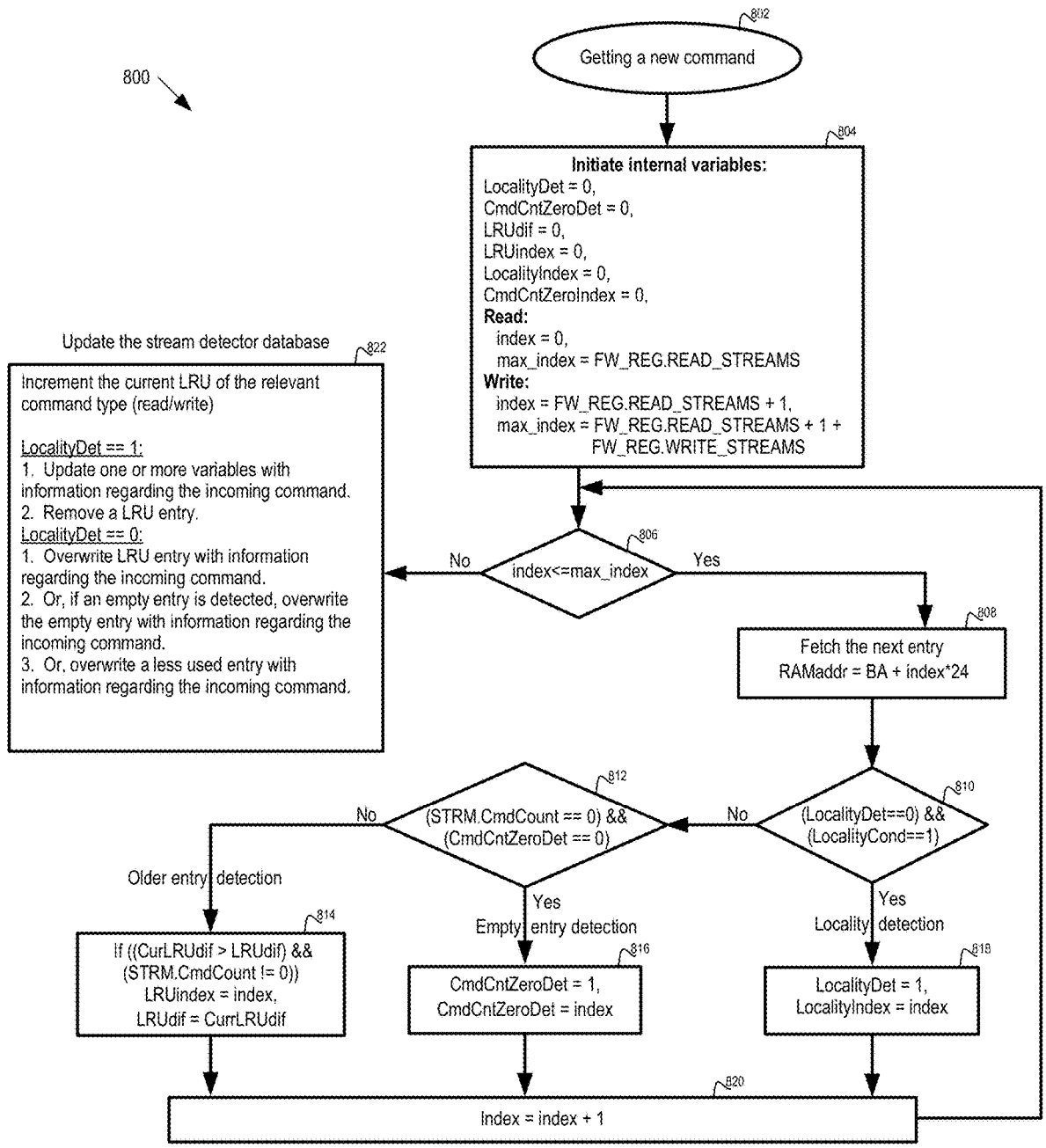
FIG. 8 is a flow chart of a second example method of operation of the SDM.

FIG. 8 is a flow chart 800 of a second example method of operation of the SDM 532. At 802, the memory device receives a new command. At 804, the SDM 532 may initialize one or more internal variables. At 806, the SDM 532 checks the index value whether to iterate again. If so, at 808, the SDM 532 fetches the next entry. At 810, the SDM 532 checks whether locality has been detected. If locality has been detected, the SDM 532 sets variables for use at 822. If not, at 812, the SDM checks whether the entry is empty.

If so, at 816, the SDM sets one or more variables for use at 822. For example, the SDM may associate the incoming command to the stream in which locality was detected. In particular, the SDM may update the address range associated with the stream in which locality was detected for later use (such as to check against an address range for a next incoming command as discussed in FIG. 6). Further, the SDM may update the stream momentum based on analysis of the incoming command with respect to other commands in the stream. As discussed below, the stream momentum may be used for a RLA operation. In addition, the SDM may select a LRU entry for removal. In particular, the SDM may seek to remove data associated with older streams as being less relevant. In this regard, the entries associated with the older streams may be removed.

If no, at 814, the SDM 532 detects whether the entry is an older entry, and if so, sets variables for use at 822. For example, if locality is not detected, the SDM may determine where to save information regarding the incoming command. As discussed above, the SDM has a certain number of entries for read streams and a certain number of entries for write streams. In the event that locality is not detected, the SDM may assign the incoming command (whether incoming read command or incoming write command) to an entry. If there is an empty entry, the SDM may store the information from the incoming command in the empty entry. If there are no empty entries, the SDM may select the least recently used entry in order to overwrite that entry with the information from the incoming command. If the SDM cannot locate a least recently used entry, the SDM may still select an older, less recently used entry in which to overwrite with the information from the incoming command.

If the system has iterated for max_index times, the SDM 532 updates the stream detector database. For example, the SDM 532 increments the current LRU of the relevant command type (whether read command or write command). Further, if locality is detected, the SDM 532 update variables to indicate that the incoming command is associated with a particular stream. The SDM 532 further determines whether to remove an old entry. If locality is not detected, the SDM 532 replaces the oldest entry the current entry or puts the current entry in an empty entry.

As discussed above, in one implementation, the detected streams, such as the detected write streams, may be used to perform a read look ahead (RLA) operation. In particular, the memory device may activate the RLA logic, which may speculatively fetch data from the non-volatile memory to temporal buffers in an attempt to save the non-volatile memory sense latency and transfer latency. RLA logic may improve the overall performance in a case of a hit since non-volatile memory sense time and transfer time are saved. However, RLA is beneficial particularly with a high hit/miss ratio. Otherwise, the memory device may add extra traffic on the non-volatile memory by reading data and discarding it later. Thus, an efficient RLA algorithm benefits the operation of the memory device.

In one implementation, the memory device detects a write stream, and uses the detected write stream for an operation related to the write stream. One example operation related to the detected write stream is using the detected write stream in processing a non-write command. One example non-write command may be a read command. In practice, the detected write stream may be used as input to an RLA algorithm in order to process the read command. As discussed above, the SDM may be configured for fetches of commands under the NVMe standard where commands are fetched out of order. The SDM may be flexible and adaptive for both stream promotion and removal.

In one particular implementation, the RLA algorithm may analyze at least one aspect of a read command sent from the host device with the already detected write stream. For example, the RLA algorithm may determine whether the address of the read command is located within the already detected write stream. In practice, it is assumed that the host device reads data from the non-volatile memory in the same way as the data was written (e.g., the sequential read is performed for data that was previously written in sequential way). For example, random writes or sequential writes may result in a high probability of random reads or sequential reads. Hence, the memory device may extract write stream information in advance, use this information in response to receipt of a single read command, and apply the RLA algorithm. Thus, in one implementation, the RLA may begin after only receiving one read command. This is in contrast to requiring a larger number of read commands in order to detect the read stream before starting the RLA algorithm. In this regard, the already detected write stream may be instructive as to the RLA algorithm. In an alternate implementation, in addition to the write stream detection as input to the RLA algorithm, the output of a read stream detection algorithm (which analyzed the latest accepted read commands) may be input to the RLA algorithm is a stream detection algorithm.

The already detected write stream may be characterized in one of several ways. In one implementation, the detected write stream may be characterized with a start LBA and a total length, along with other information useful for RLA. For example, one, some, or all the following information from the write stream may be used to decide how much data to cache for the RLA: TOT_LENGTH (total length of the stream), CMD_NUM (e.g., the number of commands assigned to the stream), SM (stream momentum), LLBA (last logical block address), etc. In one implementation, the firmware may decide whether to use any or all of the information extracted from the write stream. Alternatively, the firmware may use the preconfigured N number of read data.

Typically, the host device sends write commands in a sequential manner, so that the memory device stores the data for the write commands is stored sequentially within the memory of the memory device. As discussed above, the SDM may detect the write stream. For example, during the write commands execution, the SDM may operate, with the write stream being detected according to configuration values in the registers. After the write stream is detected, information is saved within the write stream structure, such as illustrated in FIG. 10. The description of the fields in FIG. 10 is illustrated in FIG. 11.

When the host device subsequently sends a read command that is located within the already detected write stream, the RLA algorithm may start to pre-fetch the requested read data altogether with the additional following read data according to information located within write stream.

Figure 9:
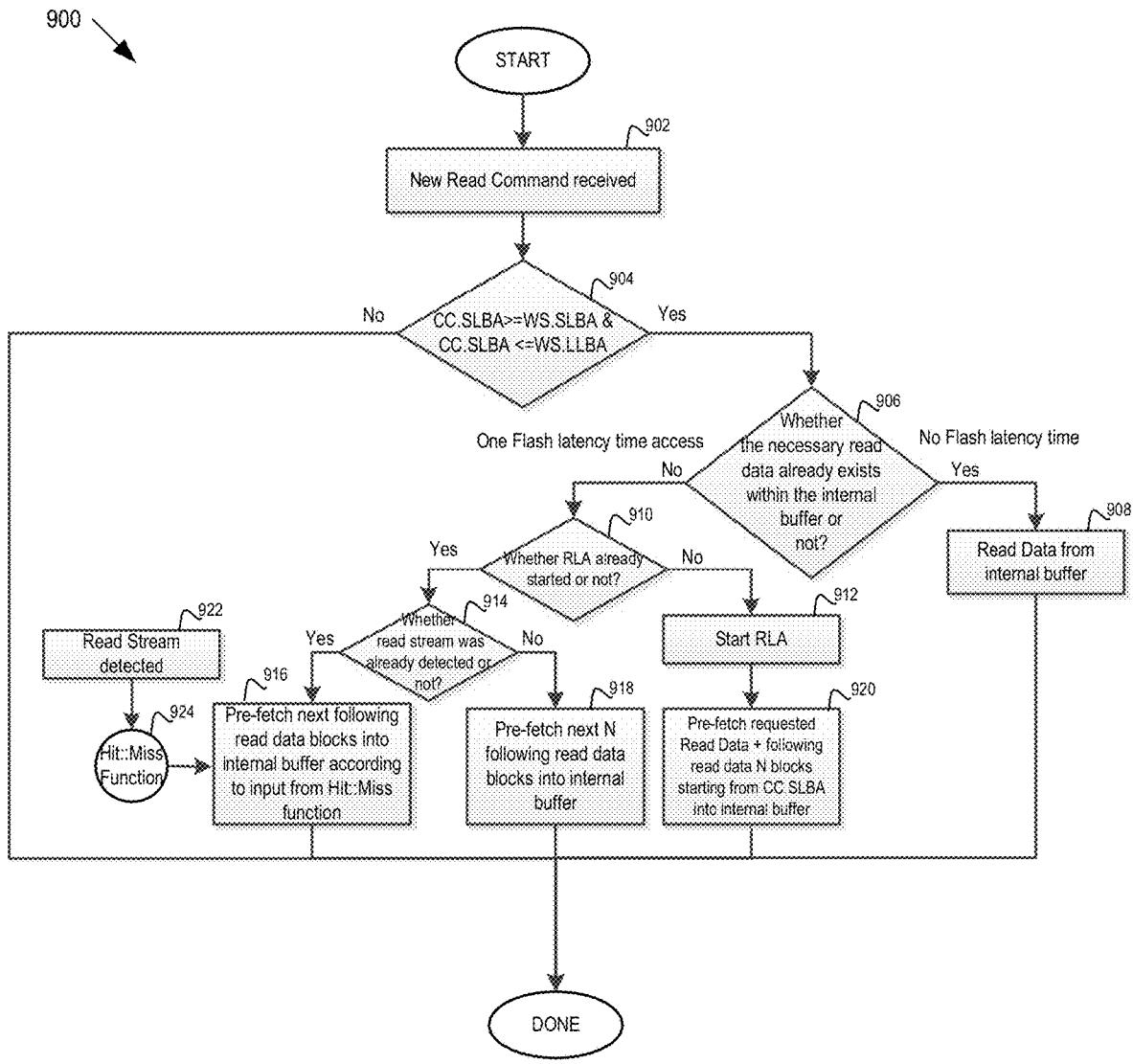
FIG. 9 is a flow chart of an example method of a read data operation.

FIG. 9 is a flow chart 900 of an example method of a read data operation. At 902, the memory device receives a new read command. The memory device may then determine whether the address in the received read command is within a previously detected write stream. For example, at 904, the memory device determines whether the current command start LBA (CC.SLBA) is greater than or equal to the write stream start LBA (WS.SLBA) and whether the current command start LBA is less than the write stream last LBA (WS.LLBA). If yes, the address for the received read command is within a previously detected write stream.

At 906, the memory device determines whether the necessary read data already exists within the internal buffer or not. If yes, no flash read need be performed (so that there is no flash latency time) and at 908, the data is read from the internal buffer. If not, a flash read is performed, and at 910, the memory device determines whether the RLA operation has already started for this specific read command or not. If not, at 912, the algorithm will start RLA and at 920 will pre-fetch the requested read data and the following read data N blocks starting from CC.SLBA into internal buffer. Depending on the stream momentum determination, the N blocks read may be in the forward direction or the backward direction. In particular, in response to determining that the stream has forward momentum (discussed above), the N blocks of data is read starting from CC.SLBA and in the forward direction. In response to determining that the stream direction is has backward momentum, the N blocks of data is read starting from CC.SLBA and in the backward direction.

In one implementation, N, the number of blocks for the RLA, may be a predetermined static number. In an alternate implementation, N may be selected based on the previously detected write stream. For example, the address range and/or the total length of the previously detected write stream may determine the number N of blocks for the RLA.

If the RLA operation has already started, at 914, the memory device performs the last check whether the read stream was already detected or not. If not, at 918, the algorithm pre-fetches the preconfigured N number of read data blocks. If yes, at 916, the algorithm pre-fetches the number of read data blocks according to input from Hit::Miss function 924. The Hit::Miss function may begin to operate as soon as the read stream is detected. The information from the read stream detected during the memory device's operation at 922 may be used as input to the Hit::Miss function. The Hit::Miss function may be configured as an adaptive algorithm that decides how much of the next read data blocks to pre-fetch for the possible use in the near future. In one implementation, the Hit::Miss function may be a straightforward algorithm that decides which number (other than N) to read into internal buffer. The decision may be based on the information contains in the detected read stream.

Thus, in using flow chart 900, flash latency times may be reduced. In particular, though the first flash latency time will not be saved, the latency for all following read data requests will be saved in the event that the requested data was already pre-fetched. Further, using the detected write stream enables quicker prediction and preparation of the read data even before the memory device detects the read stream.

In still another implementation, the memory device may identify addresses or address ranges as being often accessed by the host device. In particular, to reduce the access latency to specific addresses or ranges of addresses, the memory device may use a hot range algorithm to identify these addresses or address ranges. In particular, some operating systems, such as the Windows® operating system, often access the same LBA or small range of LBAs. In this regard, identifying these addresses or address ranges may improve performance by preparing the necessary data within the internal buffer. In a specific implementation, the hot range algorithm may be used in conjunction with other algorithms, such as a RLA algorithm. An RLA algorithm, used on its own, may cause unnecessary deleting/overriding of prepared data within the internal buffer with a new more relevant data. However, the data indicated as being associated with a hot address (or hot address range) may be treated differently. For example, the "hot" data may be saved in the temporal buffer and tagged such that the memory device allows such data to be saved for a longer time and/or for a longer use.

The hot range algorithm may use the information regarding the previously detected write/read streams as input. In this way, the memory device may store the data, stored in the hot addresses or hot address ranges, in internal buffer/s with or without storing it the data in non-volatile memory, as discussed further below.

In one implementation, the following equations describe the calculation made by the SDM in order to determine the value of the Hot Range field:

$$\text{stream\_range}=|\text{CC.LBA}-\text{SDB.SLBA}|$$

$$\text{CC.HR}=((\text{stream\_range}<<\text{CFG})<=\text{SDB.TOT\_LEN})\ \&\ \text{StreamDetected}$$

where CC.LBA: current command start LBA
SDB.SLBA: stream start LBA
SDB.TOT_LEN: stream total length
CFG: configuration value, with the stream_range being multiplied by $2^{\text{CFG}}$
StreamDetected: stream detected indication
CC.HR: result of the HOT RANGE algorithm.

The hot range algorithm may be applied for each new command to the detected stream. The hot range algorithm may be based on the 'stream_range', which is the absolute value of the last command (new command) start LBA and the streams start LBA (as shown above), and on the total flow through the stream (cumulative sector count) while not including the length of the new coming command. The hot range bit contains valid information only when StreamDetected indication signal indicates that a stream is detected. Otherwise, the hot range bit is cleared.

In a more specific implementation, to make the criteria less sensitive, the stream range is multiplied by CFG value, with the amount settable in a register. Then, the multiplied stream range is compared to the total flow. In response to the multiplied range being greater than the stream's total flow, it is classified as a sequential stream (HR=0). If the stream's total flow is greater than or equal to the multiplied range, then the context is set to indicate that the command is part of a hot range (HR=1).

In practice, when identifying the LBAs that are deemed as "hot", it is beneficial to store the data stored therein in a volatile memory rather than in (or in addition to) a non-volatile memory. Further, as discussed above, the hot range algorithm may be applied upon arrival of each command from the host device. If the command falls in the hot range of one of the already detected streams, then different operations may be performed depending on the type of command. If the command is a write command, the memory device may save the data in an internal buffer (such as controller RAM). In one implementation, the memory device saves the data to the internal buffer and defers saving the data to non-volatile memory. The transfer to non-volatile memory may be deferred in expectation that the host device will soon rewrite the data, saving repeated write operations. In another implementation, the memory device saves the data both to the internal buffer and to non-volatile memory. If the command is a read command, the memory device reads the data from the internal buffer without the need to perform the read access from non-volatile memory. Thus, the memory device may apply the hot range algorithm to each arrived command while taking advantage of the already existed stream detection database. Using the hot range algorithm, hot LBAs may be filtered out from the stream detector database and may be stored in a volatile memory.

Lastly, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

The invention claimed is:

1. A method comprising:
accessing an identified read stream, the identified read stream comprising one or more read commands and an address range, the address range determined based on addresses in the one or more read commands received in a memory device;
accessing an incoming command;
reviewing an address of the incoming command, wherein the address of the incoming command is not contiguous with the address range of the identified read stream;
analyzing proximity of the address of the incoming command with part or all of the address range of the identified read stream by:
 determining an extended address range of the identified read stream, the extended address range being determined by extending a lower address of the address range by an address gap and by extending an upper address of the address range by the address gap; and
 determining whether an address range of the incoming command at least partly overlaps with the extended address range of the identified read stream;
in response to determining that the address range of the incoming command at least partly overlaps with the extended address range of the identified read stream, determining that the incoming command is associated with the identified read stream;
in response to determining that the address range of the incoming command does not at least partly overlap with the extended address range of the identified read stream, determining that the incoming command is not associated with the identified read stream; and
performing at least one access to non-volatile memory in the memory device based on the identified read stream.

2. The method of claim 1, wherein:
the incoming command comprises the address and a size of the incoming command;
an address range for the incoming command is defined by the address and the size of the incoming command; and
analyzing proximity of the incoming command with part or all of the address range in the identified read stream comprises analyzing proximity of the address range for the incoming command with part or all of the address range in the identified read stream.

3. The method of claim 2, wherein the proximity is based on an amount of data to read in at least one of the commands in the identified read stream.

4. The method of claim 3, wherein:
the identified read stream comprises a plurality of commands;
a last command comprises the command last associated with the identified read stream; and
the last command includes the amount of data to read.

5. The method of claim 2, wherein the proximity comprises a predetermined minimum proximity or a predetermined maximum proximity.

6. The method of claim 1, wherein the address gap is determined based on a predetermined minimum address gap, a predetermined maximum address gap, and a length of a command most recently associated with the identified read stream.

7. The method of claim 1, wherein performing at least one access to non-volatile memory in the memory device based on the identified read stream comprises performing a read look ahead in the non-volatile memory based on the identified read stream.

8. The method of claim 7, further comprising determining a direction of the identified read stream; and
wherein the read look ahead is performed using the direction of the identified read stream.

9. The method of claim 8, wherein:
the address range of the identified read stream is defined by a lower address and an upper address;
the direction of the identified read stream comprises either a lower address direction or an upper address direction, the lower address direction including addresses less than the lower address, the upper address direction including addresses greater than the upper address; and
determining the direction of the identified read stream comprises determining whether additional commands not yet associated with the identified read stream include addresses in the lower address direction or addresses in the upper address direction.

10. A non-volatile memory device comprising:
a non-volatile memory having a plurality of memory cells;
a communication interface configured to communicate with a host device; and
a controller in communication with the non-volatile memory and the communication interface, the controller configured to:
 identify a write command stream, the write command stream including an address range;
 receive a non-write command via the communication interface;
 determine an extended address range of the identified write command stream, the extended address range being determined by extending a lower address of the address range by an address gap and by extending an upper address of the address range by the address gap;
 determine whether an address range of the non-write command at least partly overlaps with the extended address range of the identified write command stream;
 in response to determining that the address range of the non-write command does not at least partly overlap with the extended address range of the identified write command stream, determine that the non-write command is not associated with the identified write command stream; and
 in response to determining that the address range of the non-write command at least partly overlaps with the extended address range of the identified write command stream, perform a speculative access of the non-volatile memory using part or all of the address range of the identified write command stream.

11. The non-volatile memory device of claim 10, wherein the non-write command comprises a read command.

12. The non-volatile memory device of claim 11, wherein:
the read command comprises a read address; and
the controller is configured to determine whether the read command is associated with the write command by determining whether the read address is within the address range of the write command stream.

13. The non-volatile memory device of claim 12, wherein the speculative access of the non-volatile memory comprises a read look ahead operation.

14. The non-volatile memory device of claim 13, wherein the controller is configured to perform the read look ahead operation in response to analyzing a single read command.

15. A non-volatile memory device comprising:
a non-volatile memory having a plurality of memory cells;
a communication interface configured to communicate with a host device; and
a controller in communication with the non-volatile memory and the communication interface, the controller configured to:
 access an identified read stream, the identified read stream comprising an address range and one or more read commands from the host device, the address range defined by a lower address and an upper address for the one or more read commands received in a memory device;
 determine whether additional commands not yet associated with the identified read stream include addresses in a lower address direction or addresses in an upper address direction, the lower address direction including addresses less than the lower address, the upper address direction including addresses greater than the upper address by:
  determining an extended address range of the identified read stream, the extended address range being determined by extending a lower address of the address range by an address gap and by extending an upper address of the address range by the address gap; and
  determining whether an address range of the additional commands at least partly overlaps with the extended address range of the identified read address stream; and
 perform a read look ahead of the non-volatile memory based, at least in part, on whether the identified read stream has addresses in the lower address direction or the upper address direction.

16. The non-volatile memory device of claim 15, wherein:
the identified read stream comprises a plurality of commands;
a first command comprises the command first associated with the identified read stream;
a last command comprises the command last associated with the identified read stream; and
determining whether additional commands not yet associated with the identified read stream include addresses in the lower address direction or addresses in the upper address direction comprises comparing an address associated with the last command with an address associated with the first command.

17. A method comprising:
accessing an identified read stream, the identified read stream comprising one or more read commands and an address range, the address range determined based on addresses in the one or more read commands received in a memory device;
accessing an incoming command;
determining an extended address range of the identified read stream, the extended address range being determined by extending a lower address of the address range by an address gap and by extending an upper address of the address range by the address gap;
determining whether an address range of the incoming command at least partly overlaps with the extended address range of the identified read stream;
in response to determining that the address range of the incoming command at least partly overlaps with the extended address range of the identified read stream, determining that the incoming command is associated with the identified read stream;
in response to determining that the address range of the incoming command does not at least partly overlap with the extended address range of the identified read stream, determining that the incoming command is not associated with the identified read stream; and
in response to determining that the incoming command is associated with the identified read stream, executing the incoming command by performing at least one operation on a volatile memory in the memory device without performing the at least one operation on a non-volatile memory in the memory device.

18. The method of claim 17, wherein:
the command comprises a write command; and
the at least one operation comprises saving data associated with the write command in the volatile memory, with saving of the data to the non-volatile memory deferred in an expectation that the data will be written again.

19. The method of claim 17, wherein:
the command comprises a read command; and
the at least one operation comprises reading data associated with the read command from the volatile memory without reading the data from the non-volatile memory.

20. A non-volatile memory device comprising:
a non-volatile memory having a plurality of memory cells;
a communication interface configured to communicate with a host device;
means for accessing an identified read stream, the identified read stream comprising one or more read commands and an address range, the address range determined based on addresses in the one or more read commands received in a memory device;
means for accessing an incoming command received via the communication interface;
means for reviewing an address of the incoming command, wherein the address of the incoming command is not contiguous with the address range of the identified read stream;
means for analyzing proximity of the address of the incoming command with part or all of the address range of the identified read stream by:
 determining an extended address range of the identified read stream, the extended address range being determined by extending a lower address of the address range by an address gap and by extending an upper address of the address range by the address gap; and
 determining whether an address range of the incoming command at least partly overlaps with the extended address range of the identified read stream;
means for determining, based on an analysis of proximity, whether the incoming command is associated with the identified read stream by:
 in response to determining that the address range of the incoming command at least partly overlaps with the extended address range of the identified read stream, determining that the incoming command is associated with the identified read stream; and in response to determining that the address range of the incoming command does not at least partly overlap with the extended address range of the identified read stream, determining that the incoming command is not associated with the identified read stream; and means for performing at least one access to the non-volatile memory based on the identified read stream.

21. The non-volatile memory device of claim 20, wherein:

the incoming command comprises the address and a size of the incoming command;

an address range for the incoming command is defined by the address and the size of the incoming command; and the means for analyzing proximity of the incoming command with part or all of the address range in the identified read stream comprises means for analyzing proximity of the address range for the incoming command with part or all of the address range in the identified read stream.

22. The non-volatile memory device of claim 21, wherein the proximity is based on an amount of data to read in at least one of the commands in the identified read stream.

\* \* \* \* \*